United States Patent
Fish

(10) Patent No.: US 8,250,058 B2
(45) Date of Patent: Aug. 21, 2012

(54) TABLE FOR STORING PARAMETERIZED PRODUCT/SERVICES INFORMATION USING VARIABLE FIELD COLUMNS

(76) Inventor: Robert D. Fish, Tustin, CA (US)

( * ) Notice: Subject to any disclaimer, the term of this patent is extended or adjusted under 35 U.S.C. 154(b) by 284 days.

(21) Appl. No.: 11/615,824

(22) Filed: Dec. 22, 2006

(65) Prior Publication Data

US 2007/0088723 A1     Apr. 19, 2007

Related U.S. Application Data

(63) Continuation-in-part of application No. 11/550,490, filed on Oct. 18, 2006.

(60) Provisional application No. 60/753,964, filed on Dec. 22, 2005, provisional application No. 60/728,370, filed on Oct. 18, 2005.

(51) Int. Cl.
*G06F 17/30* (2006.01)
*G06F 17/00* (2006.01)

(52) U.S. Cl. ........ 707/708; 707/795; 707/796; 707/801; 707/803

(58) Field of Classification Search .................. 707/1–5, 707/101–102
See application file for complete search history.

(56) References Cited

U.S. PATENT DOCUMENTS

| | | | | |
|---|---|---|---|---|
| 5,826,257 | A * | 10/1998 | Snelling, Jr. | 1/1 |
| 5,842,218 | A * | 11/1998 | Robinson | 1/1 |
| 6,035,294 | A | 3/2000 | Fish | |
| 6,366,910 | B1 * | 4/2002 | Rajaraman et al. | 1/1 |
| 6,604,107 | B1 * | 8/2003 | Wang | 707/101 |
| 6,625,596 | B1 * | 9/2003 | Nunez | 707/3 |
| 6,687,711 | B1 * | 2/2004 | Nunez | 707/104.1 |
| 6,751,600 | B1 * | 6/2004 | Wolin | 706/12 |
| 7,337,166 | B2 * | 2/2008 | Bailey et al. | 1/1 |
| 2003/0163465 | A1 | 8/2003 | Morrill | |

* cited by examiner

*Primary Examiner* — Yicun Wu
(74) *Attorney, Agent, or Firm* — Fish & Associates, PC

(57) ABSTRACT

Computer implemented systems store descriptions of multiple different types of marketplace items as a collection of parameter-value pairs, using a table having a plurality of rows and columns, wherein values for at least two of the items are stored in cells of first and second ones of the rows, respectively; keys that provide information that can be used to decipher differential mappings of a plurality of the columns to a plurality of parameters in different ones of the rows; and one or more interfaces that collectively display previously stored parameters and values to a human end-user.

21 Claims, 20 Drawing Sheets

SUPERSEARCH™

20 { Search   Web Search   Search History   Add New Items   Preferences

Queries                                                   Record Sets

| Search name | ▼ |  | ▼ |
|---|---|---|---|
| User | ▼ |  |  |
| Date | ▼ |  | ▼ |
| Time | ▼ |  | ▼ |
| Project | ▼ |  | ▼ |
| Subproject | ▼ |  | ▼ |
| Record Set | ▼ |  | ▼ |
| Other search | ▼ |  | ▼ |
| Other search relationship | ▼ |  | ▼ |
|  | ▼ |  | ▼ |
|  | ▼ |  | ▼ |
|  | ▼ |  | ▼ |
|  | ▼ |  | ▼ |

| Record set name | ▼ | Best sailboats | ▼ |
|---|---|---|---|
| User | ▼ | Joe |  |
| Date | ▼ | 11/15/05 | ▼ |
| Time | ▼ | 5:05pm | ▼ |
| Project | ▼ | Office boat | ▼ |
| Subproject | ▼ |  | ▼ |
| Search name | ▼ |  | ▼ |
| Other record set | ▼ | Sailboats | ▼ |
| Other record set relationship | ▼ | Parent | ▼ |
|  | ▼ |  | ▼ |
|  | ▼ |  | ▼ |

53 { Show Recommended  ShowAll  Go          Show Recommended  ShowAll  Go

Figure 5B

SUPERSEARCH™ — 10

Search  Web Search  Search History  Add New Items  Preferences

— 332
— 331

Personal Information (* required for bidding on auctions)

| | | |
|---|---|---|
| * | Last name | Smith |
| * | First name | Joe |
| * | Address1 | 234 Toner St. |
| | Address2 | |
| * | City | Blacksburg |
| * | State | CA |
| * | Country | USA |
| * | Postal code | 92626 |
| * | Email address | jsmith@bbb.com |
| * | Password | Pass79 |
| * | Credit Card Type | ▶ |
| * | Credit Card No. | |
| * | Expiration month | ▶ |
| * | Expiration year | ▶ |
| * | CIS code | |
| | Occupation | Teacher ▶ |
| | Interests | Computers ▶ |
| | Interests | Sports ▶ |
| | Interests | Broncos ▶ |
| | Marital status | Single ▶ |

— 300

Maximum number of records output — 342
   20 50 100 150 200

Web Search Number of Records — 344
   50 100 250

Standard Units — 346
   American  British  European (MKS)

Override Units — 348
   (see table to right)

Language — 350
   English  French  German  Japanese

Adult filter search — 352
   On  Off

360 ▶

| | |
|---|---|
| Area (medium) | square feet ▶ |
| Area (large) | square feet ▶ |
| Bits & Bytes | megabytes ▶ |
| Density | ounces/cubic inch ▶ |
| Energy | KCal ▶ |
| Force | pounds force ▶ |
| Length | feet |

Save  Clear

Figure 7

Edge Cache Items / 800

| RecNo (4) | UserID (4) | DateAdd (3) | DateDelete (3) | Private (1) | Class (2) | Set (1) | V1 (16) | V2 (16) | V3 (16) | V4 (16) | ... | V26 (16) | V27 (16) |
|---|---|---|---|---|---|---|---|---|---|---|---|---|---|
| 1 | 2342 | 1/1/06 | 12/31/07 | 0 | 1111 |  | <txt> | <pnt> | <pnt> | <pnt> |  | <txt> | <pnt> |
| 2 | 344 | 1/1/06 | 12/31/07 | 0 | 223 |  | <txt> | <txt> | <num> | <txt> |  | <txt> | <txt> |
| 3 | 6633 | 1/1/06 | 12/31/07 | 0 | 111 |  | <txt> | <txt> | <txt> | <txt> |  | <txt> | <txt> |
| 4 | 4444 | 1/1/06 | 12/31/07 | 0 | 2534 | 23 | <txt> | <txt> | <num> | <txt> |  | <num> | <txt> |
| 5 | 4444 | 1/1/06 | 12/31/07 | 0 | 2534 | 23 | <txt> | <pnt> | <txt> | <pnt> |  | <num> | <txt> |
| 6 | 4444 | 1/2/06 | 12/31/07 | 1 | 2323 |  | <txt> | <num> | <txt> | <txt> |  | <txt> | <num> |
| 7 | 566789 | 1/2/06 | 12/31/07 | 0 | 223 |  | <txt> | <pnt> | <txt> | <pnt> |  | <txt> | <txt> |
| 8 | 67854 | 1/2/06 |  | 0 | 234 |  | <num> | <num> | <pnt> | <txt> |  | <txt> | <txt> |
| 9 | 44 | 1/2/06 |  | 0 | 222 |  | <num> | <txt> | <txt> | <pnt> |  | <txt> | <pnt> |
| 10 | 30990 | 1/2/06 |  | 8 | 1999 |  | <num> | <txt> | <txt> | <pnt> |  | <pnt> | <txt> |
| ... |  |  |  |  |  |  |  |  |  |  |  |  |  |
| $10^8$ | 999322 | 6/15/07 | 6/15/08 | 0 | 45 |  | <txt> | <num> | <txt> | <txt> |  | <txt> | <num> |

Figure 11

TABLE FOR STORING PARAMETERIZED PRODUCT/SERVICES INFORMATION USING VARIABLE FIELD COLUMNS

This application is a Continuation-In-Part of Ser. No. 11/550,490 filed Oct. 18, 2006 which claims priority to provisional application No. 60/728,370 filed Oct. 18, 2005, and further claims priority to provisional application No. 60/753,964 filed Dec. 22, 2005.

FIELD OF THE INVENTION

The field of the invention is databases for storing and retrieving information.

BACKGROUND OF THE INVENTION

It is now widely recognized that the main challenge to information storage and retrieval is not availability of information, but filtering that information. Modern search engines that rely on keyword searching have advanced that science to a high art, but searches performed with such search engines often yield an intractably large number of records. For example, a recent search for diamonds on e-Bay™ yielded more than 6000 records, and the same search on Yahoo!™ Shopping yielded more than 570,000. The problem is even worse on general search engines that are not specifically focused on marketplace items. A recent search on Google™ for diamonds yielded about 24,300,000 records.

Not only are there too many records in a typical results set, but the fact that the records are so inconsistent in content and terminology means that it is impossible to filter them correctly. To continue with the diamond example, it is extremely difficult to search for a diamond in the 1,000 to $2,000 price range, because there is no convenient way to match a record that lists a diamond for $1,499.85. The current answer to that problem is to tag the data with metatags, special codes that identify particular items of data. Using Microsoft's™ XML tags, for example, it is possible for a search engine to identify a number as a price, and then store the price in an indexed field. In that manner the search engine could find records with information that matches a range of prices.

Tagging works reasonably well for the parameter (also known as a characteristic or attribute) of price, but only because price is common among a great many marketplace items. The system loses much of its effectiveness as soon as one begins to focus on parameters that are specific to different types of goods and services. In the diamond example, a searcher might well be interested in only those diamonds having a size of at least 1 carat, clarity of at least VVS2, color of at least E, and so forth. The only way metatags could be used effectively to filter through only the desired diamonds would be for the data to have been stored using consistent metatags, and that just isn't done. Thus, despite the prevalence and enormous power of modern search engines, they are still of very limited usefulness in conducting searches such as the diamond example above. To search for that limited selection of diamonds on eBay™ one would have to actually view each and every one of the more than 6,000 records.

As a result of the inability of search engines to adequately narrow searches based upon multiple different parameters, there are still many millions of databases used for specific classes of products. For example, there are automobile databases that store item information using fields for one or more of make, model, year, mileage, and price. Similarly, there are boat databases that store boat information in fields for make, model, year, condition, and price, and also length, displacement, number of sails, number and size of engines, number of cabins, and so forth.

Unfortunately, there are still very significant problems with those specialty databases. For one thing, the sheer number of specialty databases means that the data is distributed, forcing a searcher to examine the data from many different databases for even a single type of product. Thus, a searcher conducting a thorough search for a used car is forced to examine hundreds or even thousands of automobile databases. There are consolidator services that collect data from many different databases, but disparity in the underlying data forces them to present the data in formats that cannot be properly filtered, and are still incredibly time consuming to utilize.

A second problem with specialty databases is that they exist only for a relatively small number of products and services. One would be hard-pressed to find anything even close to a comprehensive flashlight database, or a comprehensive ball-bearing database. The closest that one finds in such fields are vendor listings that show only the particular products they have to sell.

A third problem with specialty databases is that they tend to parametize the data using only a very limited number of parameters. For example, the automobile databases typically do not parametize color or condition. A searcher wanting to view only red automobiles in at least very good condition needs to view the memo text, and sometimes the images, of every single record to find desired automobiles.

What is needed is a universal database that parametizes data for all different types of goods and services. But the very fact that different types of items require different sets of parameters makes it extremely difficult to store multiple different types of items in a single database. Instead of a table with 5 or 6 columns that might be needed for a single type of item, a simple flat table adequately storing different types of items might well need thousands of columns. Still further, the cells of such a table would be mostly empty, since only a few of the cells in each row would be populated.

These problems were addressed in U.S. Pat. Nos. 6,035,294, 6,195,652, and 6,243,699, the disclosures of which, along with all other extrinsic materials cited herein, are incorporated herein by reference. In those three patents the focus was on a database that evolved by virtue of: (a) users being able to add their own parameters for a given type of item; and (b) the list of available parameters being shown to subsequent users in a list that was sorted by frequency of use. Frequently used parameters would eventually float to the top of the list, while infrequently used parameters would sink to the bottom of the list. It was still further contemplated that users could add their own values to a values listing, which would similarly be sorted by frequency of use, so that commonly used values would appear at the top of the list while infrequently used values would sink to the bottom.

By way of example, a user would list an automobile for sale by selecting 10 or 15 parameters from a list of possibly 30 or more automobile related parameters. Since the list of available parameters would be sorted by prior usage frequency, the 10 or 15 parameters that the user would most want to utilize would be those at the top of the list. Most likely, the user would thereby decide to describe his automobile using make, model, year, color, mileage, etc. He could select a parameter called exhaust system, or add such a parameter if it wasn't already in the list, but he would be dissuaded from doing so by a desire to conform to the prior usage patterns of others. With respect to values, the user would likely see that prior values for color are white, black, red, green, blue, etc. He might also see that off-white is a color that had been used by others, but he would likely be dissuaded from using off-white because that color is much farther down the list than white.

Since there are many thousands of different types of products and services for which one could store records on the database, it was contemplated that the classification scheme should be hierarchical. The patents cited above contemplated a three level classification tree, including major class, minor class, and item description.

In terms of database structure, the U.S. Pat. No. 6,243,699 cited above contemplated separate tables for users, classification, parameters, values, and items, with the items table having columns for classification pointers, parameter pointers, and value pointers. Assuming that each item could be adequately described with a relatively small maximum number of parameter/value pairs, the items table only needs about 2n+c columns, where x is the maximum number of parameter/value pairs, and c is a small number (perhaps 5) to identify classification, date, user pointer, and so forth. Assuming that each row consumed only about 256 bytes, one could store 100 million items in only 25 gigabytes.

It is also now appreciated that users might well want to identify and classify results sets in particular, and groupings of records in general, according to their own preferences. For example, with respect to groupings of records, a given user might search for a new home having a given set of parameter/value pairs (e.g. zip code=9262?, sq ft≧2500, no. bedrooms≧, lot size≧10,000 sq ft), and then use active links to view the actual properties. In doing so he develops a set of properties that he wants to pursue, and after doing all that work he may well want to find some way of storing (and characterizing) that record set for future use. Perhaps even more importantly, a given user might want to see how other users characterized the same or similar groupings of records. It is already known for users to store search strings (queries) for later use or reference. That is already done on Lexis-Nexis,™ Micropatent™ and other search facilities. It is also already known for users to store results sets, either directly from the search engine or as modified. Micropatent, for example, stores sets of records in "worksheets."

It appears, however, that there is no teaching, suggestion, or motivation in the prior art for storing queries and record sets relating to a storage system in which users can add their own parameters. It also appears that the prior art is entirely silent as to enabling ordinary unsophisticated users (as opposed, for example, to database designers or programmers) to store characterize their queries and/or record sets using multiple, open-ended characterizations. All the prior art systems that the current inventor knows of, merely allow a user to associate a fixed set of information with a query or results set, including for example, name of the query, matter number, run frequency, output format, and so forth. One item in particular that is missing from the prior art is identification of parent, child, sibling, or other relationships between or among different queries or different results sets.

The U.S. Pat. No. 6,195,652 mentioned in passing that "some of the classifications may also deal with miscellaneous information, including scientific articles, historical facts, and so forth." The implication was that informational items should be considered goods and services, and subject to users classifying such items with whatever parameters and values they wished. Unfortunately, there was no teaching, suggestion or motivation, for users to couple the content of the item to other items. Thus, it was contemplated that a user loading data might classify a book by title, author, subject, type of work (novel, fantasy, etc), quality of work (compelling, silly, thoughtful, etc), length (180,000 words, or perhaps 459 pages) on a book by book basis. In that manner, a subsequent user could, for example, search for novels of less than 250 pages characterized as compelling. But there was no consideration given to other users classifying books (or other items) having records that were loaded by others, which could be accomplished by subsequent users characterizing their own data sets.

Thus, it is now contemplated that many of the ideas disclosed in those prior patents could be improved upon. For example, allowing users to add their own parameters to the database may be problematic because users could add all manner of stupid and inconsistent parameters. It is also contemplated that sorting parameters and values by frequency of prior occurrence could in many instances be cumbersome. In selecting a value for color, for example, a user might simply prefer to see an alphabetic list of colors that had been used by others. It is also contemplated that even a three level classification scheme is too complicated for many users, and that the data structure previously described, although very efficient for storing data, would be far too slow for retrieving data. It is still further contemplated that users can store their searches and record sets in an open-ended parameter/value manner. Thus, there is a need for further improvements.

SUMMARY OF THE INVENTION

The present invention contemplates systems, databases, methods and implementations for parameterized storage and retrieval of multiple different types of specific marketplace items.

In one aspect it is contemplated that instead of listing available parameters for a given classification of item by frequency of prior usage, the system can advantageously provide users with a broader list of available parameters, and narrower list of recommended parameters. One or both of the lists are preferably sorted alphabetically, are scrollable, and users can select which list to view using a radio button. Narrower lists are preferably limited to no more than 30, 25, 20, or 15 parameters. It is also contemplated that values listings for a given parameter and item classification can advantageously be displayed to a user with broader list and narrower (recommended) listings.

In another aspect, it is contemplated that users would be limited to suggesting additions of new parameters to the system, rather than having the ability to automatically add new parameters on their own, without oversight. This new paradigm may well be superior to that taught in the U.S. Pat. Nos. 6,035,294, 6,195,652, and 6,243,699 because it is entirely possible that the general public cannot be trusted to add parameters on their own. Among other things, it is contemplated that a user could suggest the new parameter for use with one or more specific item classifications, and if accepted, the new parameter could be designated as part of a recommended subset of available parameters. It is also contemplated that users could suggest additions of new values to the system, for use with particular parameters, and that such new values could thereafter be included in preferred or other values listings.

In yet another aspect, a database implementing the system preferably includes a table having a plurality of parameter records, each of which includes a designation as to whether that parameter is recommended. The parameter records also preferably include designations for item classification, so that a common parameter such as price might be stored using thousands of records, corresponding to the thousands of different item classifications for which price is a useful parameter. In addition, parameter records preferably include designations for information type (e.g. text, image, video, audio), units (e.g., meters, kilograms, seconds, miles), data type (e.g. integer, floating point, telephone number, text (literal), and link), confidentiality designation (i.e. private or public), and limited choice designation (e.g., yes or no; red, white or black; in stock or out of stock).

In yet another aspect, systems can utilize an item classification based in whole or in part upon a trademark classification. This aspect allows a system to get up and running for substantially all classes of goods and services without having to design an entirely new classification, while also benefiting from a system that is designed to distinguish goods and services by how they are perceived in the marketplace. Preferred item classifications are relatively flat and simple, and in the case of the US and international classification systems used by the US Trademark Office (within the United States Patent and Trademark Office), the system is only two level. Especially preferred item classifications have at least a 25%, 50%, 75%, 80% and 90% homology with a US classification used by the USPTO.

In yet another aspect, systems can utilize a data structure in which value data is stored in cells of a table for which a given column can represent multiple different parameters. Thus, for example, $cell_{E,10}$ (i.e., column E, row 10) might well store a price, while $cell_{E,11}$ might well store a color. Such as data structure could readily store parameterized data for a hundred millions items that collectively use tens of thousands of different parameters, in less than 30 GB, yet provide incredibly efficient searching. It is also contemplated that one can store data in a localized or distributed repository, and then send copies of subsets of the data (preferably data for specific item classifications) to edge caches for searching. It is still further contemplated that the repository data could be stored using one data structure, and data in the edge caches could be stored using a different data structure.

Of particular interest are computer implemented systems that store descriptions of multiple different types of marketplace items as a collection of parameter-value pairs, comprising: a table having a plurality of rows and columns, wherein values for at least two of the items are stored in cells of first and second ones of the rows, respectively; keys that provide information that can be used to decipher differential mappings of a plurality of the columns to a plurality of parameters in different ones of the rows; and one or more interfaces that collectively display previously stored parameters and values to a human end-user.

As used herein, references to "first" and "second" ones of the rows should be interpreted according to customary patent lingo to mean any two rows, whether or not those specific rows are logically stored first and second in the table. the Also as used herein, the term "human end-user" means a person who is a member of the general public, as opposed to a computer programmer or other person having specialized control over the database.

In yet another aspect, systems are contemplated in which at least one of the stored values comprises a link that resolves as a particular item of data other than a file, a web site, and an email address. The data can resolve to any desired data, including text of no more than 10, 15, 20, 30, 40, or 50 characters, a currency amount, a number having no more than 5, 10 or 15 significant digits. All suitable links are contemplated, including an IP address, an IP address and an offset, a data tag name, and an HTML code. The resolved data can advantageously be encrypted or privatized in some other manner, so that it will effectively be available to some users and not to others. This aspect of contemplated systems allows overlap and smooth interaction with proprietary databases, such as the reservations and sales databases of airlines, ticket agencies, lodging providers, as well as databases of auction facilitators, dating services, and employment and a job listing sites In yet another aspect, systems are contemplated in which data is loaded using the steps of associating individual identifiers with individual ones of the parameters; publishing a list of the identifiers and associated parameters; examining a set of items for which values are organized using at least some of the published identifiers; extracting item data from the set of items, and storing the extracted item data in the database; associating the item data with a provider, storing contact information for the provider in a provider record, and associating the stored item data with the provider record in the database; and distributing the stored item data to at least two edge cache databases that are accessible by ordinary consumers for retrieval of the items. The items to be loaded are preferably stored in Excel™ or other spreadsheet(s), can be transmitted as a file for loading, or can be accessed using a link on a packet switched public access network. The identifiers can advantageously include metadata tags.

In yet another aspect, systems can advantageously comprise a facility with which data providers can privatize individual values within their loaded data. One preferred such facility comprises a database that designates a specific parameter as being private, and a data display interface that enforces the privacy of a corresponding private value. Another such facility comprises an interface through which the data providers can designate a value as being private even though a parameter to which the designated value is associated is not designated as being private. Still another such facility comprises the data providers storing as private values pointers to encrypted data elements. Regardless of the specific facility utilized, the data display can advantageously depicts the private value using a marker other than the private value, a null, or at least one blank. Markers can have the same or (preferably) different lengths from the value, and markers can be automatically replaced with the private value for appropriate users, or replaced on an ad-hoc basis with a pass code or other device.

In yet other aspects, users can store and characterize queries and record sets, and relationships between or among them, using a subset of available parameters.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 5B is a mock-up of a sample search history interface, through which a user can find previously saved queries and record sets, in this case showing a user accessing previously saved record sets.

FIG. 7 is a mock-up of a sample preferences interface, through which a user can store biographical and financial data on himself, and can select interface preferences such as number of records to display, adult content filter, and preferred units of measurement.

FIG. 11 is a schematic of an items table having 16 soft parameters columns.

DETAILED DESCRIPTION

A. Interfaces

Figure 1A:
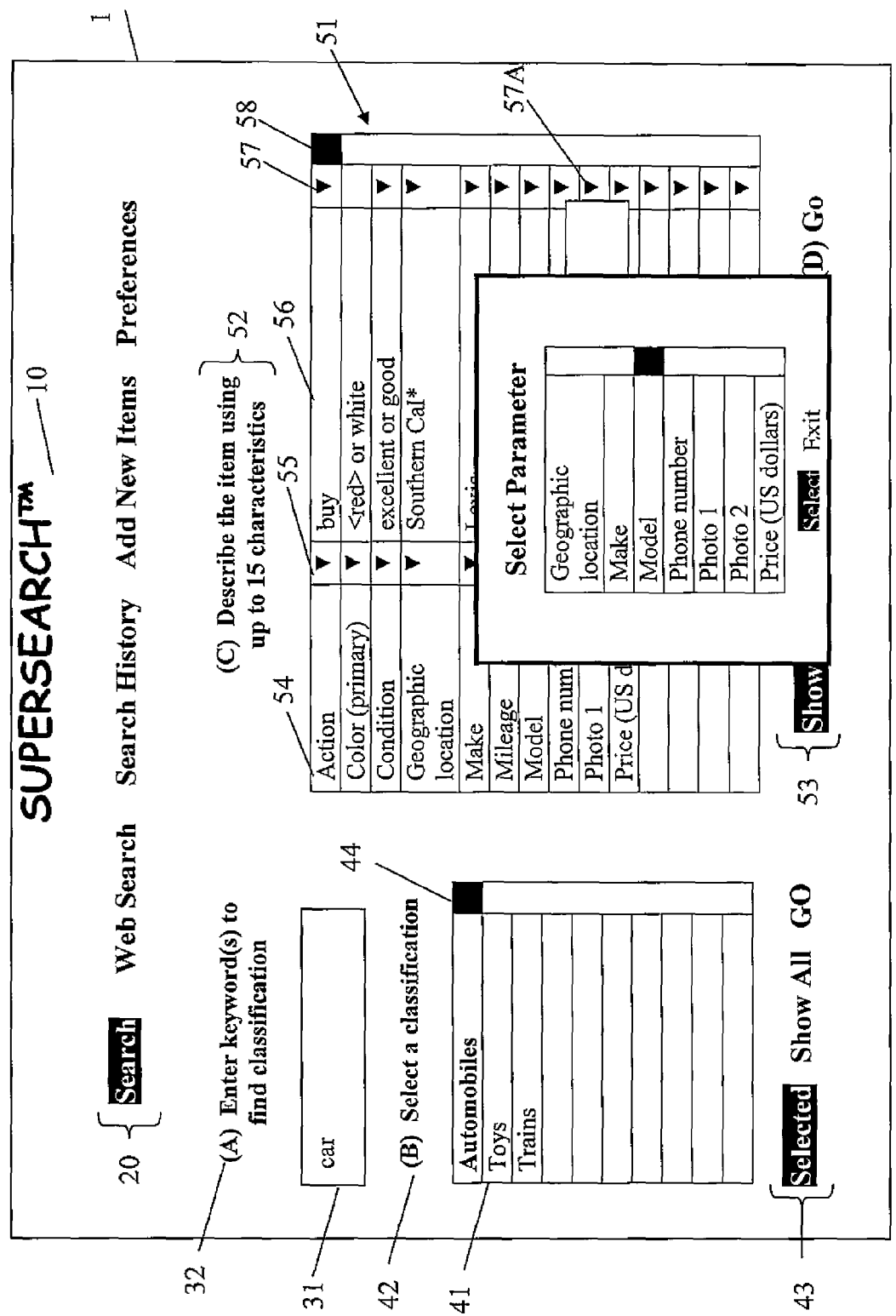
FIG. 1A is a mock-up of a sample search interface, showing a drop-down box to select parameters.

In FIGS. 1A-1D, a sample search interface 1 generally comprises a company identifier 10, a navigation line 20, box 31 and instructions 32 for entering keywords to identify an appropriate item classification, a classification results interface 41 and instructions 42, and an item description interface 51 with instructions 52.

As used herein, the terms "user", "data provider", "data searcher" and the like refer to natural persons within the general public, who may be entirely unsophisticated in their use of computers and databases, acting in their capacities as ordinary users of the system, and not to persons acting in their capacities as programmers, systems analysts or the like who modify the structure (as opposed to the content) of a database. The terms do not include computer programs, bots, and the like.

The mockups use the company identifier, Supersearch. That term is intended to be purely hypothetical, and any association with the same or similar name is purely accidental and unintentional.

Most of the items on the list will be self-explanatory. The general concept is that a user navigates if necessary by clicking on the search box in the navigation line 20. In step (A) the user then enters one or more keywords in box 31. In this particular example a user entered the term "car". Depressing a tab, enter or other appropriate key on the user's keyboard causes the system to list possible item classifications. As used herein the term "causes" is used in a broad sense to include direct and indirect causation. Thus, a clicking action of the user only causes the system to respond in a given manner in the sense that there is software being executed by a computer that runs though sets of commands to achieve the result. Indeed, it should be appreciated that all of the computer steps discussed in this applicant are contemplated to be executed on one or more computer, and that all such software must at some time be resident on one or more computer readable media.

Having considered numerous different possible classification systems, and having even designing an extensive three level system, it is now contemplated that the best route is to utilize a classification that is the same as, or at least derived from, a trademark classification system. Such systems are already designed and battle-tested, and distinguish products and services the way they tend to be distinguished in the eyes of ordinary consumers. The two most preferred such classification systems are the US and International classification systems used by the US Trademark office. An example is shown in FIG. 1A. Here the user typed car, which on the USPTO webpage for Acceptable Identification of Goods and Services at http://tess2.uspto.gov/netahtml/tidm.html returns 95 listings, from "dope for model airplanes" in class 002 to ordinary "cars" in class 12, to "entertainment services" for participation in sporting events in 39.

In addition to physical goods and services (e.g, cars, boats, concert tickets, medical service providers), it should be understood that preferred systems can also include classifications for intellectual goods and services (e.g., newspaper, magazine and journal articles, definitions, and miscellaneous information such as home repair instructions), people, and so forth. As discussed below, there can also be classifications for users of the system (both those loading data and those merely searching), queries, and record sets. The last two categories can facilitate data mining based upon searches and record sets stored by others.

In step (B) the user can then double click on one of the selections to populate the parameters table 51. Since many users might balk at the term parameters, the interface uses the friendlier term, characteristics; the two being considered interchangeable in this application. Alternatively, the user can click on the Show All button on the classification selection line 43, which presents the user with an alphabetical listing of all classifications. Item 44 is a slider, which is of course only useful where there are more classifications in the list than can be displayed in the space available.

Figure 1B:
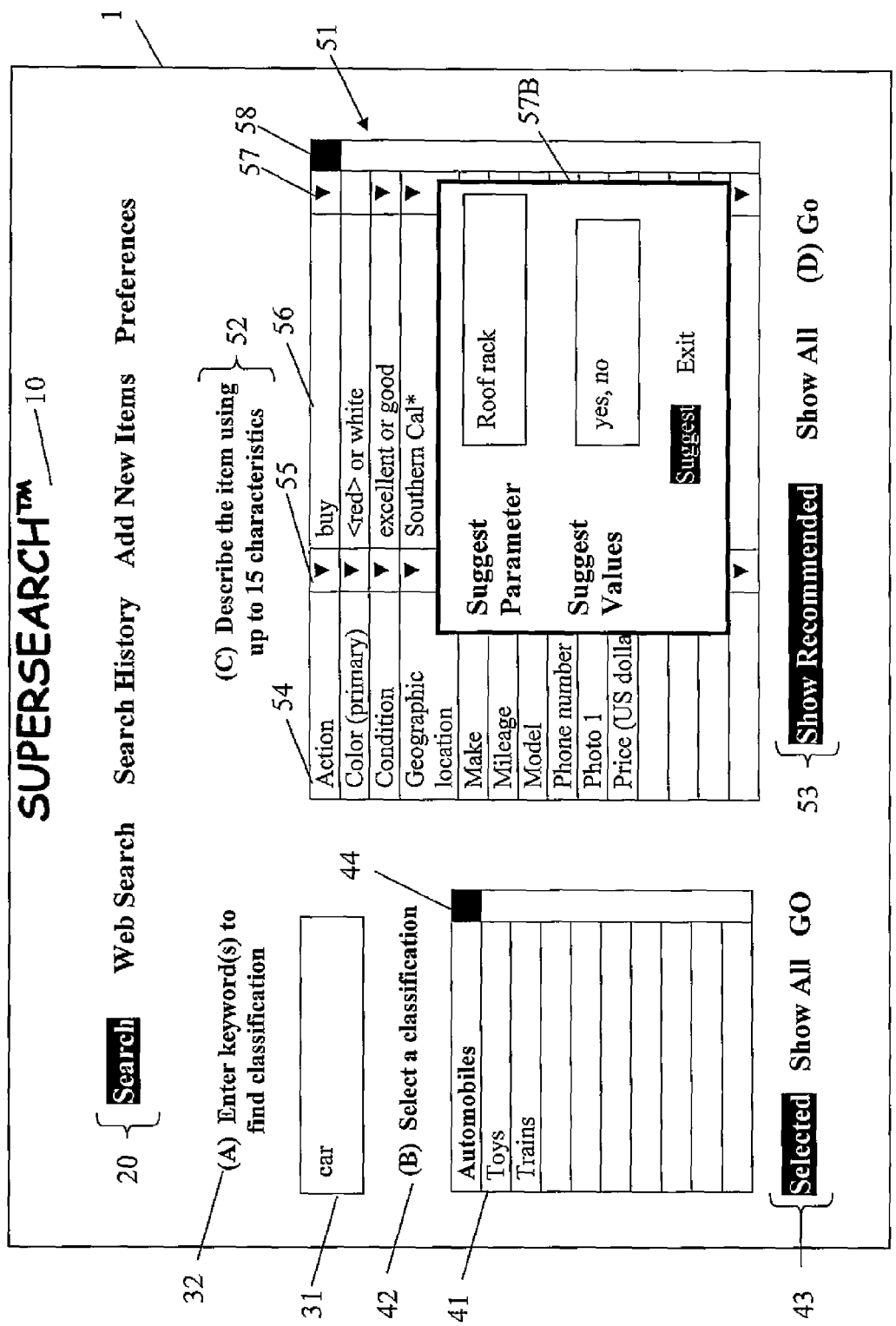
FIG. 1B is s the mock-up of FIG. 1A, showing a drop-down box to suggest addition of a new parameter, in this case roof racks for automobiles.
Figure 1C:
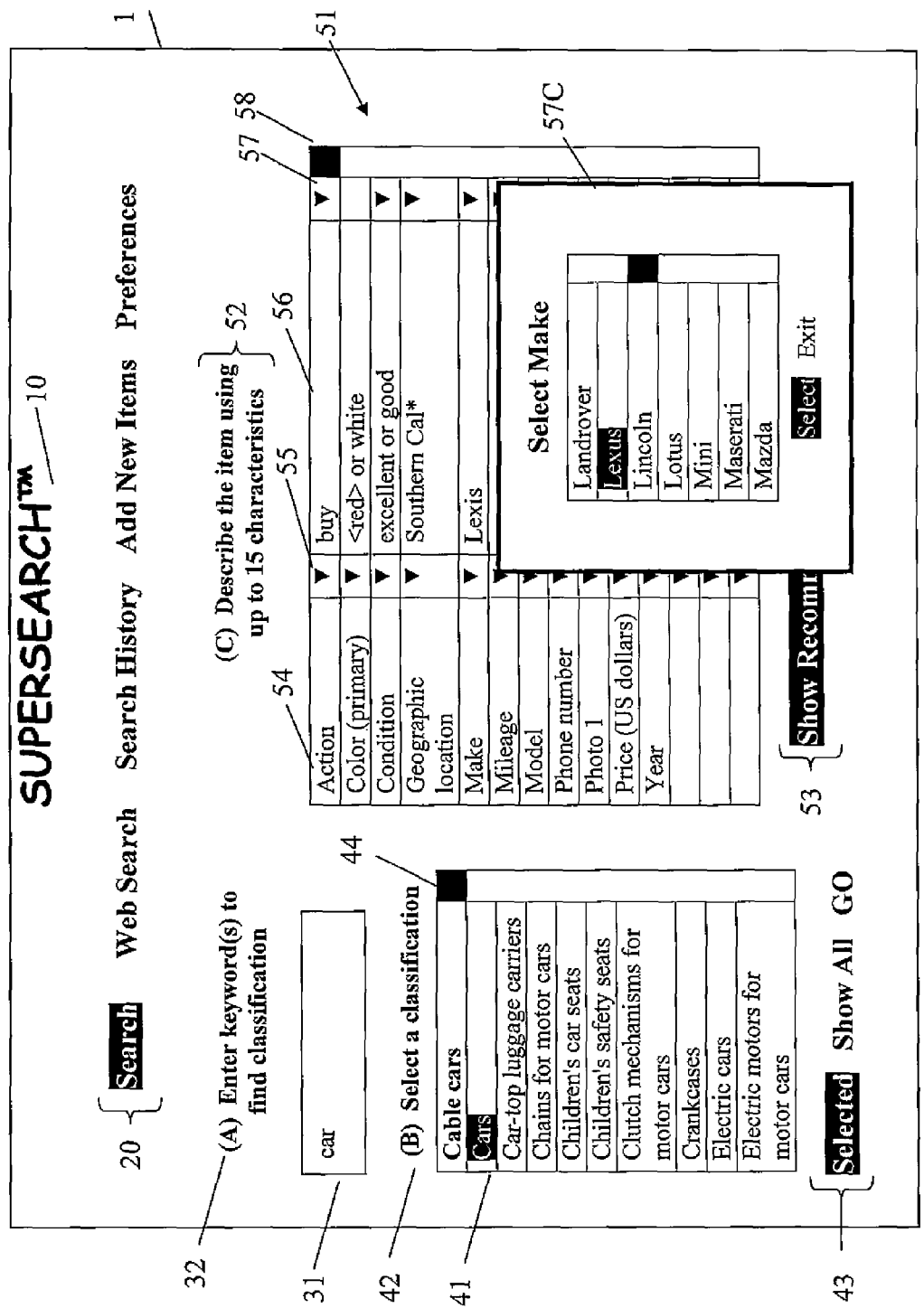
FIG. 1C is the mock-up of FIG. 1A, additionally showing a drop-down box to select values, in this case a make of an automobile.

In step (C) the user changes one or more of the parameters 54 using the drop-down trigger 55 designated with the "▼" character, and then enters a filter value 56 if desired for one or more of the parameters, either by typing in data or by using the drop-down trigger 57, again designated with the "▼" character. FIG. 1A additionally shows a sample pop-up box 55B for selecting a parameter, in this case from the recommended parameters listing. FIG. 1B additionally shows a sample pop-up box 55B for suggesting a new parameter, in this case "Roof rack". FIG. 1C additionally shows a sample drop-down box 57C for selecting a value, in this case automobile makes from the recommended values listing. Slider 58 allows the user to view additional rows (if any) of parameters/value pairs. Typically the user will be limited to selecting only a maximum number of parameters, such as 10, 15, 18, 20. The maximum number may remain constant, or perhaps more advantageously, may be changed by the system depending the item classification, since filtering for some types of items could require more parameters than others.

It is also contemplated that the available values from which the user makes his selection can be based not upon the recommended values for the corresponding parameters, but could be the universe of values for such parameters in a given record set. This alternative makes particularly good sense when doing trying to narrow down records from a web search (see FIG. 3), or when recalling a stored record set using search history (see FIG. 5B).

The item description selection line 53 allows a user to choose between listing only narrower recommended groups of parameters and values in the drop-down boxes, and listing broader groups of parameters and values. The system obviously could utilize separate selection buttons for parameters and values, but in this particular instance a single set of buttons controls both. Although optional, providing users with recommended lists is considered to be an important feature, and a significant advantage over the prior art. Among other things it still encourages users to add and search for commonly parameters and values, and thereby encourages but does not require strict conformance to a severely limited set. The lists can be sorted in any suitable manner, but more helpfully will likely be sorted alphabetically.

Although most of the appropriate parameters would presumably be available to the user in either the narrower or broader listing of parameters for this particular item classification, it is contemplated that users could suggest adding a parameter or even a value. Any suitable trigger could be used to pop up or otherwise access a suggestion window, but to keep matters simple it is preferred systems automatically pop up a suggestion window (see e.g. box 59) whenever a user enters text (not pure numbers) that doesn't match a previously known parameter or value.

It is contemplated that a user can only have one value for a given parameter, unless they are listed in the alternative. Thus, a user could select cars that are red or white, but not cars that are red and white, at least not while using a single parameter called color. To accommodate cars with two colors, the system can use parameters such as Color (primary) and Color (secondary). This manner of handling multiple values for a single type of parameter It is still further contemplated that parameters can be related, so that choosing one parameter causes the system to automatically utilize the coupled parameter(s). Couple Parameters are most advantageously those parameters that relate to hierarchical information in the real world. Thus, if a user were to use the term "volume" as parameter with respect to automobiles, it would be wise to couple that parameter with another parameter such as "engine cylinders" or "interior". Otherwise it is unclear whether the user is referring to engine displacement, interior space, trunk size, or size of gas tank.

Photos, video, and audio files can be searchable. Suitable filtering values will tend to vary from classification to classification, but as a general guide it can be said that such files can be searchable by matching with a link, another file, or description. For example, an audiovisual file could be searched for a particular sound clip, or it could be searched for text in a file name. Most of the time, however, it is contemplated that a user will include parameters relating to such files so that the links to the files will appear in the results matrix.

The careful reader will appreciate still further that some values can be left blank. Indeed, it may be that a searcher will leave most of the values blank because she doesn't want to filter on the corresponding parameters. Even so, selection of desired parameters is important, since at least in preferred embodiments the results matrix will include a column for each of the listed parameters (except perhaps, to save space, those parameters for which the user selected a single value).

Figure 4A:
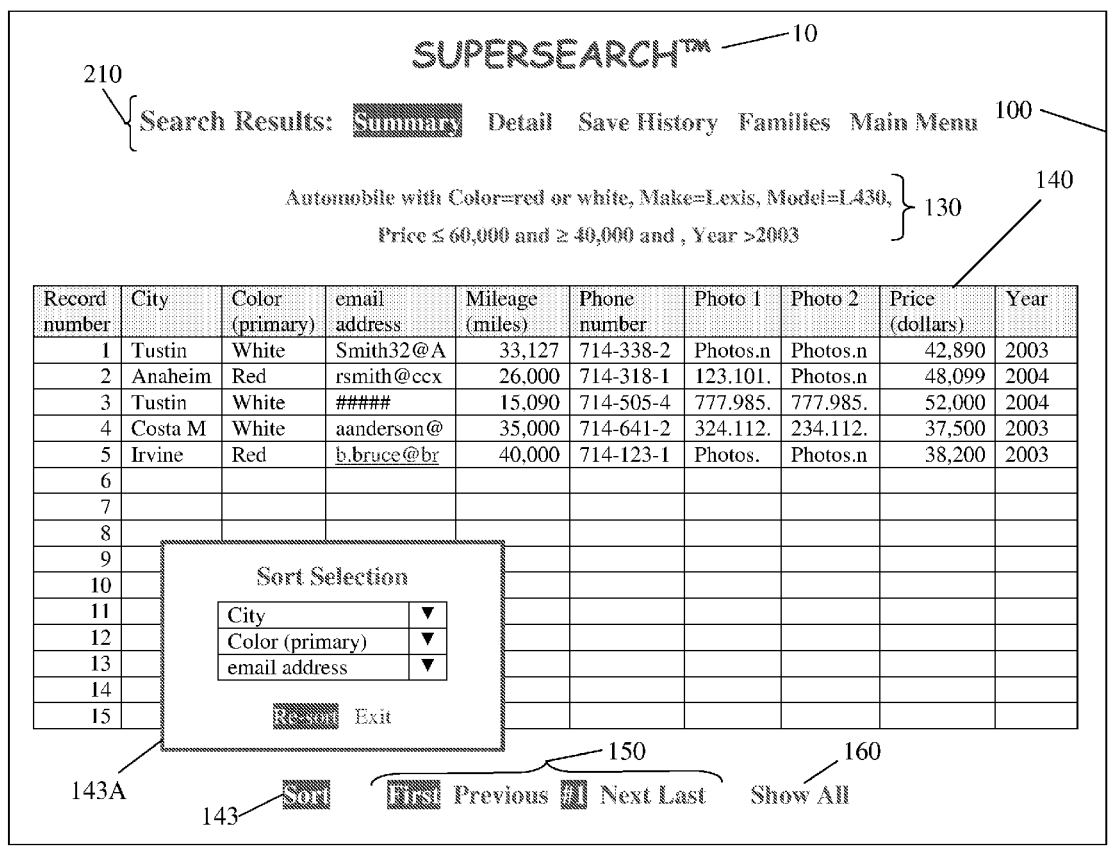
FIGS. 4A and 4B are mock-ups of sample search results display interfaces, showing summary results.

Thus, the column headings in FIG. 4A match with the parameters chosen in FIG. 1A, less those parameters for which the user selected a single value.

Of course, what constitutes the rows and columns of any table is merely a matter of perspective, and those skilled in the art will appreciate that the terms "row" and "column" are merely designators for axes in a matrix. Thus, with respect to the specification and the claims, any given description referring to rows and columns is to be interpreted both in the orientation described, and in an equivalent rotated or otherwise transposed orientation that provides substantially the same information.

Although it is not obvious from the figure, the values listed by drop-down box 59 are preferably linked to the parameter on the same line, and the selected item classification. Thus, both a narrower listing of recommended values and a broader listing of values would very likely vary significantly between an item classification of automobiles and an item classification of desktop printers. Both may include parameters of make, model, price, and condition, but automobiles would likely also include parameters for color, year, mileage and the like, while the printers might list speed, tray capacity, dots per inch, ink cartridge type, and so forth.

The recommended parameters and recommended values may be, but are not necessarily, related to frequency of prior usage. Indeed, there are advantages to recommending parameters and values that are not entirely based upon frequency of prior use, including especially the fact that the first users within a given item classification might otherwise get that classification off to a bad start by utilizing parameters and/or values that other users would find inappropriate, offensive, and so forth. It should also be appreciated that the term "recommended" parameters and values means that there is at least one parameter, or value as the case may be, that is not recommended. Thus, if a system stores values for ten parameters, and the user is shown all ten parameters without any distinguishing feature as to why one is recommended over another, then those parameters are not deemed to be recommended. The term "recommended" is also different from "required". Thus, if a system stores ten parameters for a class of items, and requires data on three of those classes, then those three parameters are not considered to be "recommended" as the term is used herein. There may be another five parameters that are recommended, and in that case there would be three required parameters, five recommended parameters, and only two parameters that are not recommended.

Some of the values, such as "buy" in the first row, and Lexis in row seven, and L430 in row nine, are very likely available in the drop-down listings. Others, such as the price in the penultimate row, are likely to be typed directly by a user. It is contemplated that the system can try to complete the entry (autofill) as soon as the user begins typing. It is also contemplated that the system can check for spelling, and if a word appears to be mis-spelled, the system can inquire as to whether the user meant one or more standard spellings of words. Row three illustrates that a user could designate that a particular value can be searched using synonyms. In this instance <red> signifies that the system should also search for values such as maroon and rose. Row three also illustrates that preferred embodiments allow users to employ Boolean logic. Row six illustrates that preferred embodiments allow a user to employ wildcards. The price and year values in the final two rows demonstrate that preferred embodiments allow users to utilize open and/or closed ranges.

Units can be handled in any suitable manner. In preferred embodiments, each parameter to which units could reasonably apply is associates with a particular unit of measurement. However, the units used by a given user would usually be determined by a table in his Preferences, and the system would perform all conversions automatically. In this particular instance the user is assumed use US dollars as his default currency, so the system shows price in US dollars. If the user had chosen to use Euros, the parameter would preferably have shown "Price (Euros). Results from units conversion would preferably be rounded as shown to the user.

Finally, in step (D) the user clicks (or double clicks depending on preferences of the interface designer) on the GO button to cause the system to begin the search.

Figure 1D:
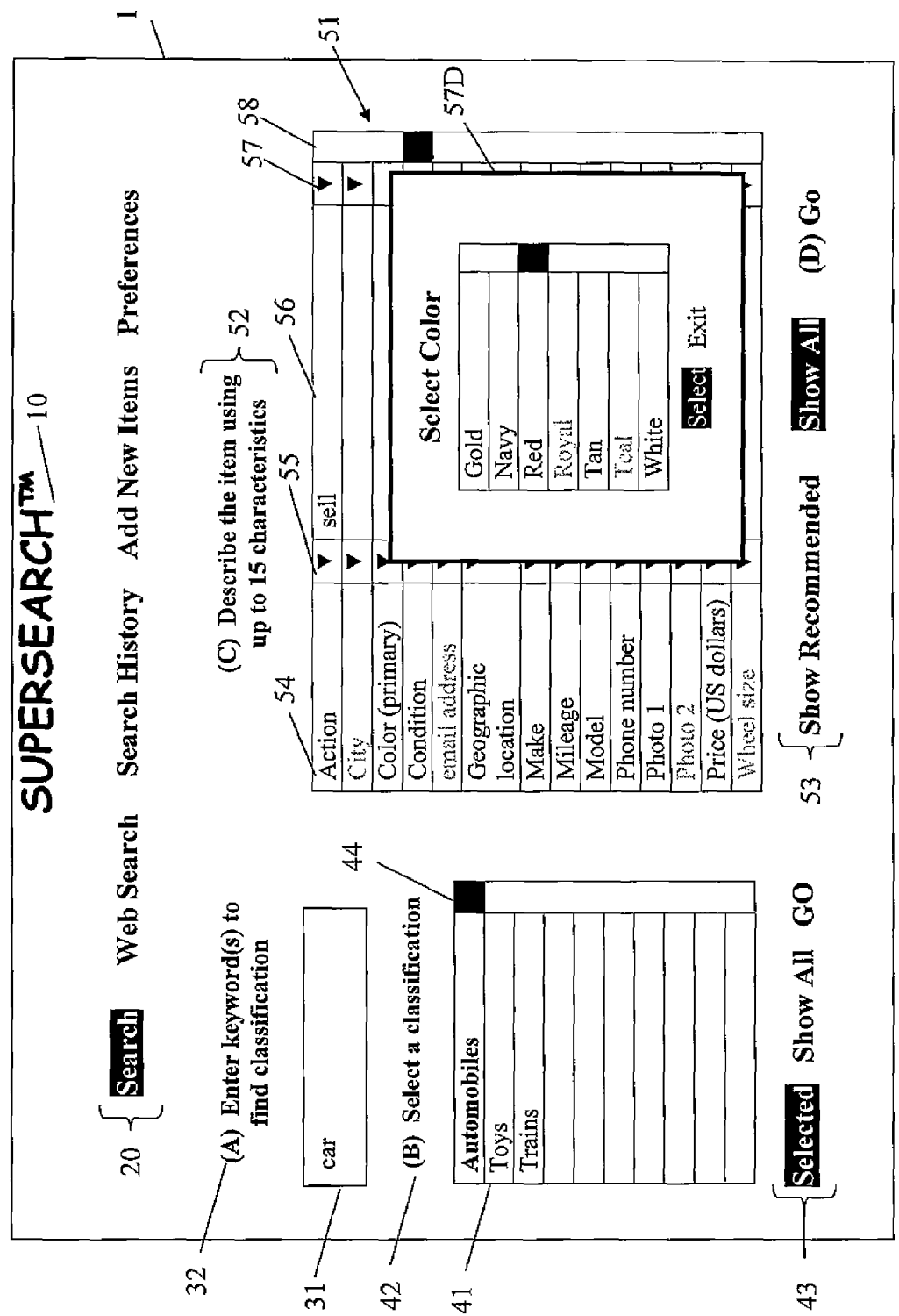
FIG. 1D is a mock-up of the search interface of FIGS. 1A-1D, but in this case the user has selected the "Show All" option.

FIG. 1D is similar to FIGS. 1A-1C, except that the Show All button is selected. Here the system shows all available parameters, with the recommended parameters differentiated in some manner from the non-recommended parameters. In this particular case the system shows recommended parameters in normal black font, while the non-recommended parameters are grayed out. All differentiators are contemplated, including for example use of italics, bolding, different colors, and use of a (R) symbol. The drop-down box 57D shows all (meaning all or at least a superset of the recommended) values previously stored with respect to the color parameter. There would usually be similar drop-down boxes for values for the other parameters.

Although this particular embodiment shows buttons to select between Show Recommended and Show All, it should be appreciated that one could simply show all parameters and values all of the time. Even in that case, though, it would be desirable to default the parameters to recommended parameters, and in that manner eliminate unnecessary work on the part of users in deleting the undesired parameters from the search interface.

Figure 2:
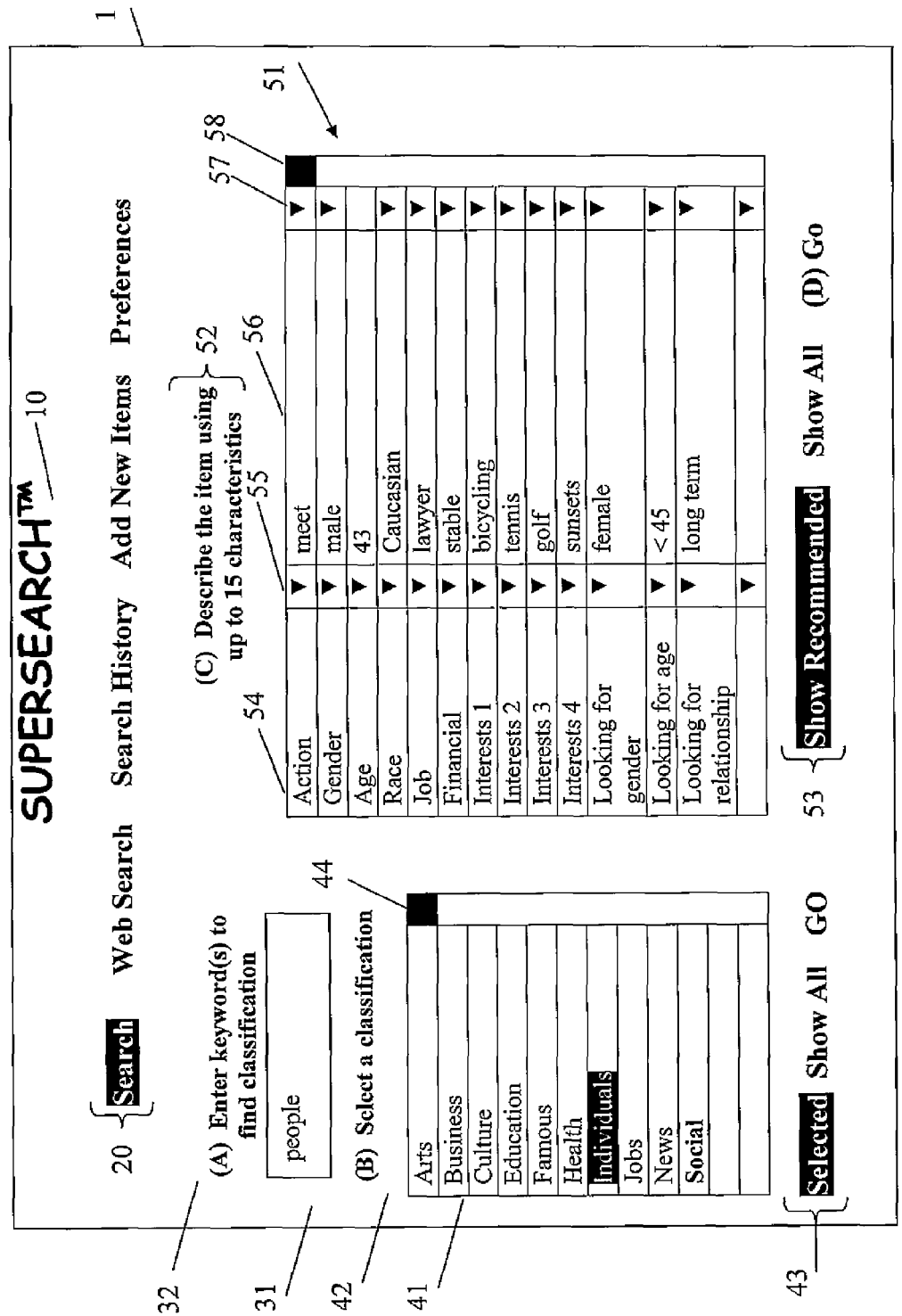
FIG. 2 is a mock-up of the sample search interface of FIG. 1A, but with different data.

In FIG. 2, the user entered "people" in the classification keyword box, and the system responded with a set of possible classifications. This listing is from another possible classification system, and is used as an example of something not taken from the US trademark classification system. A search for "people" on that latter system results in a list of 22 classifications, none of which relate to "personal want ads" for individuals. It is therefore appreciated that the classification system or systems used in conjunction with parameter/value databases for all types of marketplace information probably needs to be amended somewhat. As another example, if the number of real estate records is more than a few hundred thousand, it may be prudent to provide different classes for real estate in different states, e.g., Real estate—California, and Real estate—New York. In any event it is probably very prudent to split out Real estate-residential from Real-estate commercial.

By way of clarification, the term "marketplace" is used herein in its broadest possible sense to include everything that can be involved in a commercial or interpersonal transaction. Marketplace items include all manner of merchandise items (e.g., cars, clothes, personal grooming aids, pets and other animals, books, movies, music, travel, concert and other tickets, gasoline, electricity, writing implements, computers, houses, pharmaceuticals and medical devices, coupons, and any other items that can be bought and sold, leased, rented, traded, acquired, collected, etc), as well as all manner of service items (i.e., legal, dental, medical services, massage, handyman, new services, entertainments, etc), and also including all manner of personal interactions (i.e., employment listings, personal want ads, dating services, etc). The term "marketplace" does not include thoughts and thought processes that remain with a person's own head.

As a derivation the system actually used will almost certainly have less than a 100% homology with any trademark database system, but advantageously will have at least a 25%, 50%, 75%, 80% and 90% homology with a US classification used by the USPTO. Homology for this purpose can be calculated by determining the percentage of classifications used in classification system that have an exact or paraphrased counterpart in the trademark classification system.

Figure 3:
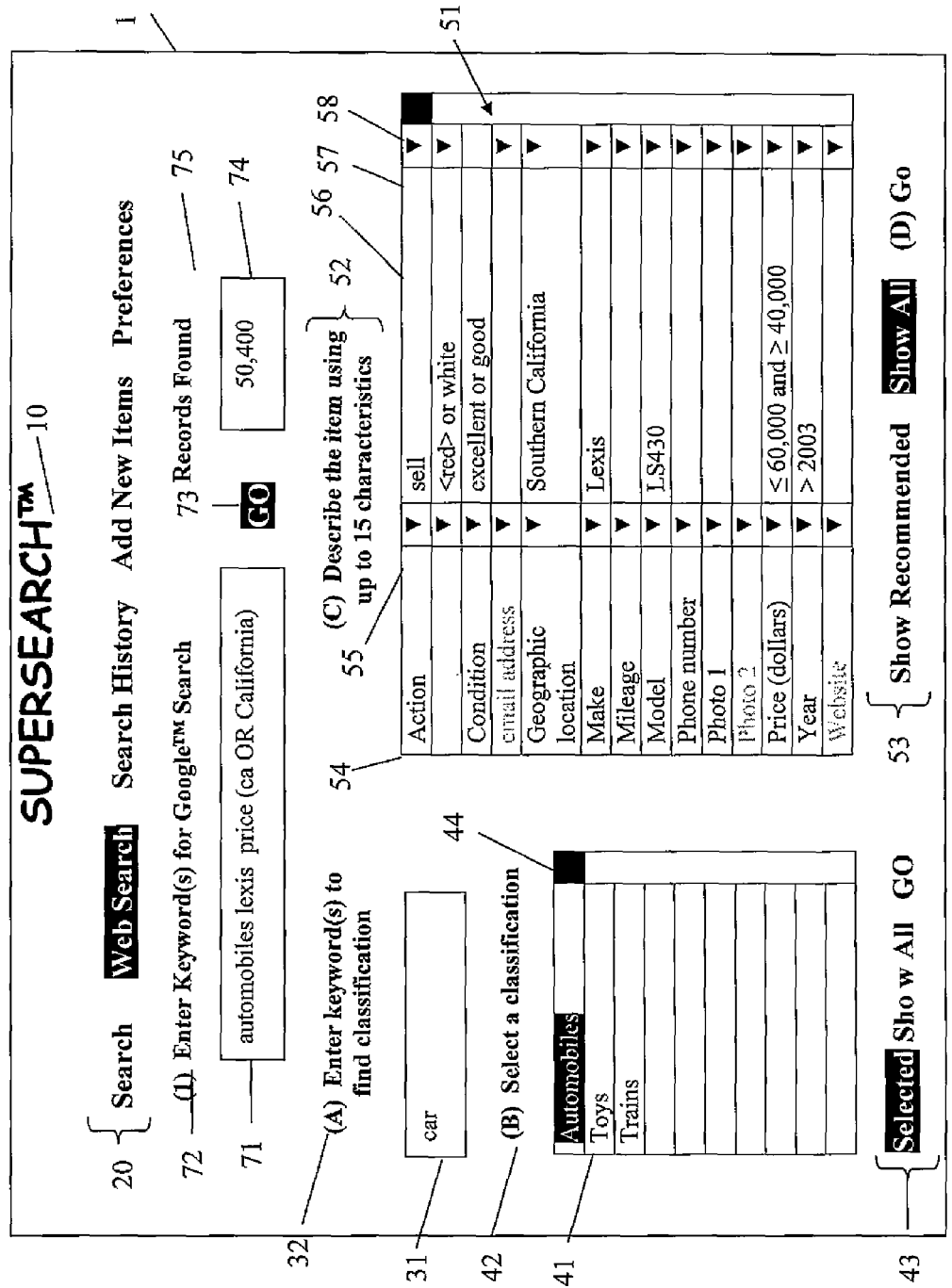
FIG. 3 is a mock-up of a sample web search interface.

In FIG. 3, the system has an additional step of selecting records from an extrinsic source, such as record links provided by a search engine results set, parametize the data in the selected records, and the perform the search on those selected records. Parametization can take place in any suitable manner, but can advantageously make use of XML or other data tags.

This additional step is designated step (1), and precedes steps (A)-(D) discussed above. In this particular embodiment a user enters a search string in field 71, using directions 72. He then presses the GO button 73, which causes the system to submit the search to Google™, Yahoo!™, Alta Vista™, Lexis™ or some other search engine (which could conceivably be chosen by clicking on the name of the search engine). Upon return of the results from the search engine, the system lists the number of results obtained, and that would or could be used as records for steps (A)-(D).

In FIG. 4A, an output interface 100 generally comprises a company identifier 10, a navigation line 120, a recap of filtering criteria 130, and a matrix 140 containing data. The matrix can be in Excel™ or other proprietary spreadsheet format, or more preferably is in a non-proprietary format. The matrix 140 can have any suitable number of data rows, but will likely have a maximum number of rows set in the Preferences interface (see FIG. 7).

In this particular case the data represents information responsive to the search of FIG. 1A. Readers will note that besides a record number, the table is limited to the columns identified in the search interface 51. This is not a hard and fast rule, but is advantageous because the user can often see in one place all the information he wants to see, but none of the information he didn't want to see. If the rows are too wide or too numerous, it is contemplated that the matrix can include horizontal and vertical sliders (not shown). It is certainly preferred that any links, such as those to the photos, will be live. It is also contemplated that clicking on the record number will trigger production of another interface (see FIG. 4C) that shows all public parameters and values for the item, whether or not they were selected by the searcher.

Sorting can be straightforward as shown. When the user clicks on the Sort button in selection row 143, the system provides a pop-up window 143A through which the user can select primary (1°), secondary (2°), and tertiary sorts (3°). User navigation among the various sets is straightforward using the First, Previous, Next, and Last buttons in navigation section 150. The user can see where he is in among the various sets, and can also jump to a particular set using the # button. There may also be a Show All button 160 that would show all records rather than just the subset of 20, 50, 100 etc records selected in the Preferences, provided of course that there are not so many records that showing all of them would be unwieldy.

The reader will also appreciate that use of a drop-down, pop-up or other box is merely a design choice. Thus, for example, drop-down boxes can actually be implemented as a box that extends upwards rather than downward from the triggering icon, or can be placed left or right of the icon, or even elsewhere on the display. The reader should therefore understand that in the present application the choice of any of these boxes is merely presented as a matter of convenience, and that any of them could readily be substituted by any other of them.

Figure 4B:
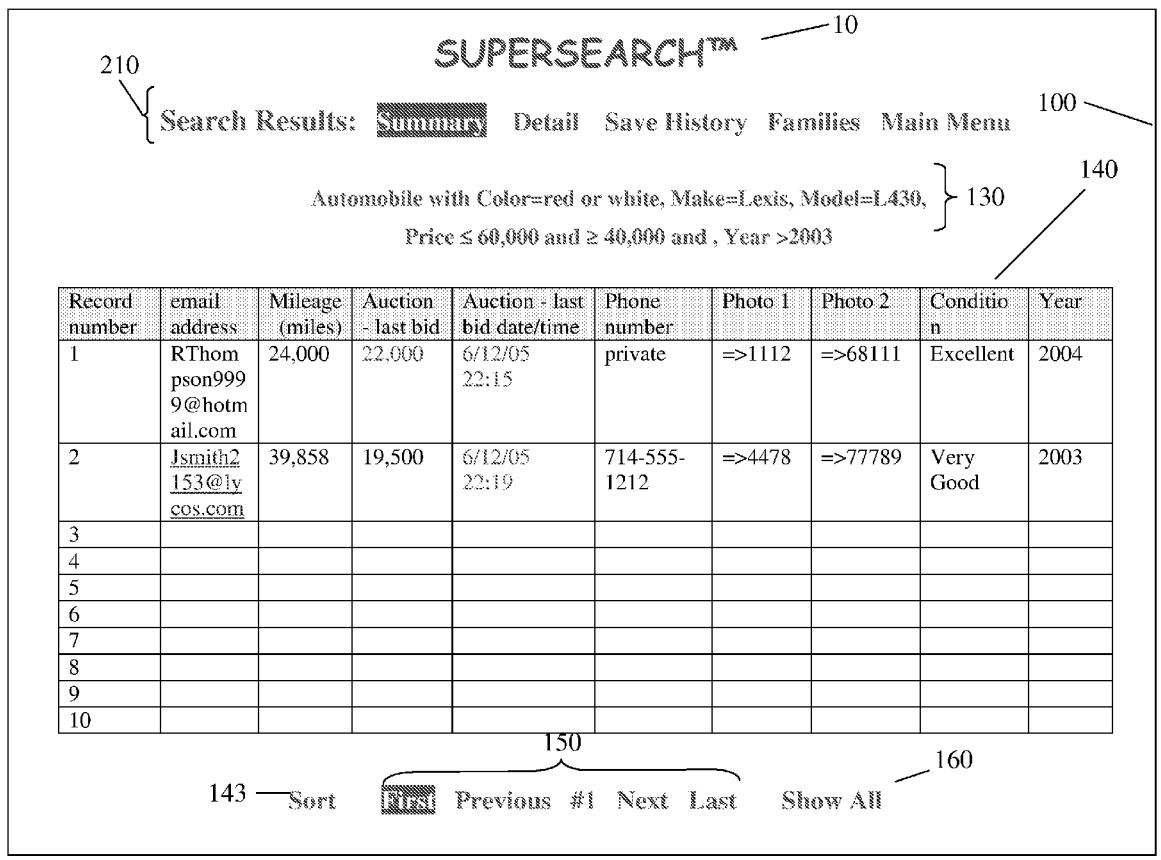

FIG. 4B is similar to FIG. 4A except that some of the columns are directed to auctions. The links there can be live, and preferably point to individual pieces of data residing on a server that handles bids. As shown, auction parameters can advantageously include: Auction, last bid amount; Auction, last bid date/time; and Auction, last bid client number.

Figure 4C:
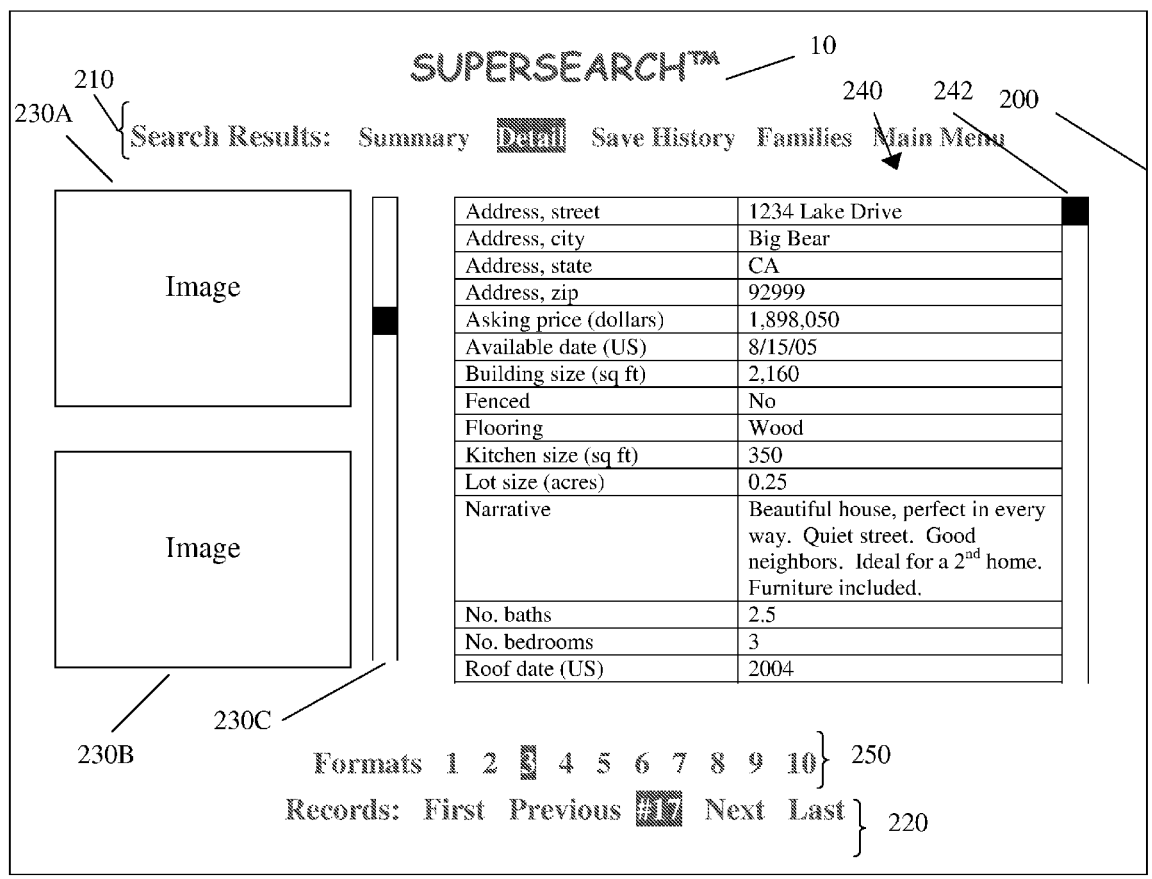
FIG. 4C is a mock-up of a sample search results display interface, showing detail of a full record.

FIG. 4C shows a preferred format for presentation of a full record interface 200, along with resolved links. As with other preferred interfaces there is a navigation line 210 to other interfaces, but here there is also a selection line 220 to select another record in the items list, e.g. 140 of FIGS. 4A-4D, or FIG. 2. There are also images 230A, 230B, and a slider 230C to select among other images. Main data table 240 lists all parameters and value pairs for this item, and also includes a slider 242. If this interface were being used to reflect items just recently entered or modified by the data provider, it would include private parameter/value pairs, but if presented to another user the interface could hide entire private parameters and/or private values. It is contemplated that the format of the interface can advantageously be selected using format selector line 250. It is presently preferred that a limited set of available formats would be provided by the system designer, although and other formats may, for example, show more a single larger image, or more images without scrolling. As currently contemplated the format could be selected by the data provider on an item by item basis when this interface is presented to verify entered data, but could still be overridden by the searcher simply by clicking on a different format.

Figure 4D:
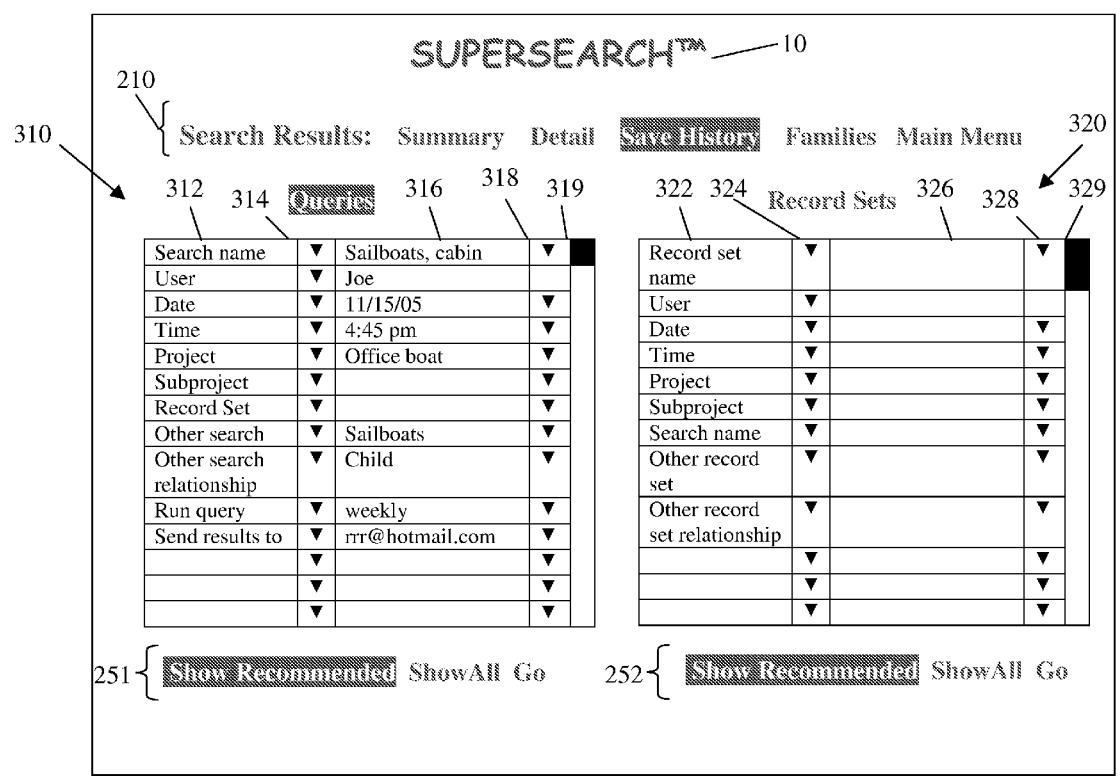
FIG. 4D is a mock-up of a sample search results display interface, through which a user can save histories of queries and record sets.

FIG. 4D is a mock-up of a sample search results display interface, through which a user can save histories of queries and record sets. There is a title 10 and a navigation line 210 as before, but here we have a query section 310 and a record sets section 320.

Query section 310 is a table similar to table 51 discussed above, with a parameters column 312 and corresponding drop-down trigger 314, and a values column 316 with its corresponding drop-sown trigger 318. Slider 319 accommodates more lines than can be conveniently shown in the table. Selection line 351 allows a user to show either recommended parameters and values or all relevant, previously stored parameters and values.

The Queries section of FIG. 4D is, of course, only applicable where the user has created a search (i.e., a query), such as through the interfaces of FIG. 1A. Having done that, the user can preferably characterize his queries in any manner he desires, using any combination of parameters and values. In this particular instance, the user has named his query "Sailboats, cabin" and has identified the query as one dealing with the "Office boat" project. The system would preferably have defaulted the user name, date, and time.

One matter of particular interest is that the user can link to, or associate with other queries. For example, one could identify the "Sailboats, cabin" search as a child of the "Sailboats" search. Any relationships could be set in that manner, but parent, child, sibling are contemplated to be especially useful because they can be readily represented in a graphical fashion, using Visio™ or similar relationship grapher. As a side note, the reader will appreciate from reading infra that the "Other search" and "Other search relationship" would very likely be logically coupled to one another using the Set field in the parameters table.

In terms of storage, the Queries record could be stored in a manner similar to, and indeed intermixed with, any other types of items records, including those for real goods and services, intellectual goods and services, record sets, users, and so forth. (See FIGS. 8, 9, 10A and 10B).

Records section 320 is a table very similar to queries table 310, except that it deals with characterizing record sets as opposed to queries. There is a parameters column 322 and corresponding drop-down trigger 324, and a values column 326 with its corresponding drop-sown trigger 328. Slider 329 accommodates more lines than can be conveniently shown in the table. Selection line 351 allows a user to show either recommended parameters and values or all relevant, previously stored parameters and values. The reader will note the stored records sets are not necessarily the exact record sets that result from particular searches. A user might well run a search, delete, modify, or add records to the set, and then save the set.

Thus, the Save Histories facility enables users to characterize both queries and record sets according to their own preferences. For example, with respect to groupings of records, a given user might search for a new home having a given set of parameter/value pairs (e.g. zip code=9262?, sq ft≧2500, no. bedrooms≧, lot size≧10,000 sq ft), and then use active links to view the actual properties. In doing so he develops a set of properties that he wants to pursue, and after doing all that work he may well want to find some way of storing (and characterizing) that record set for future use. Perhaps even more importantly, a given user might want to see how other users characterized the same or similar groupings of records. All of that is facilitated by the Save Histories facility, because users can add (or at least suggest) their own parameters. Users can also characterize relationships between or among queries, record sets, users, and any other records, using whatever parameter/value pairs they wish.

Figure 4E:
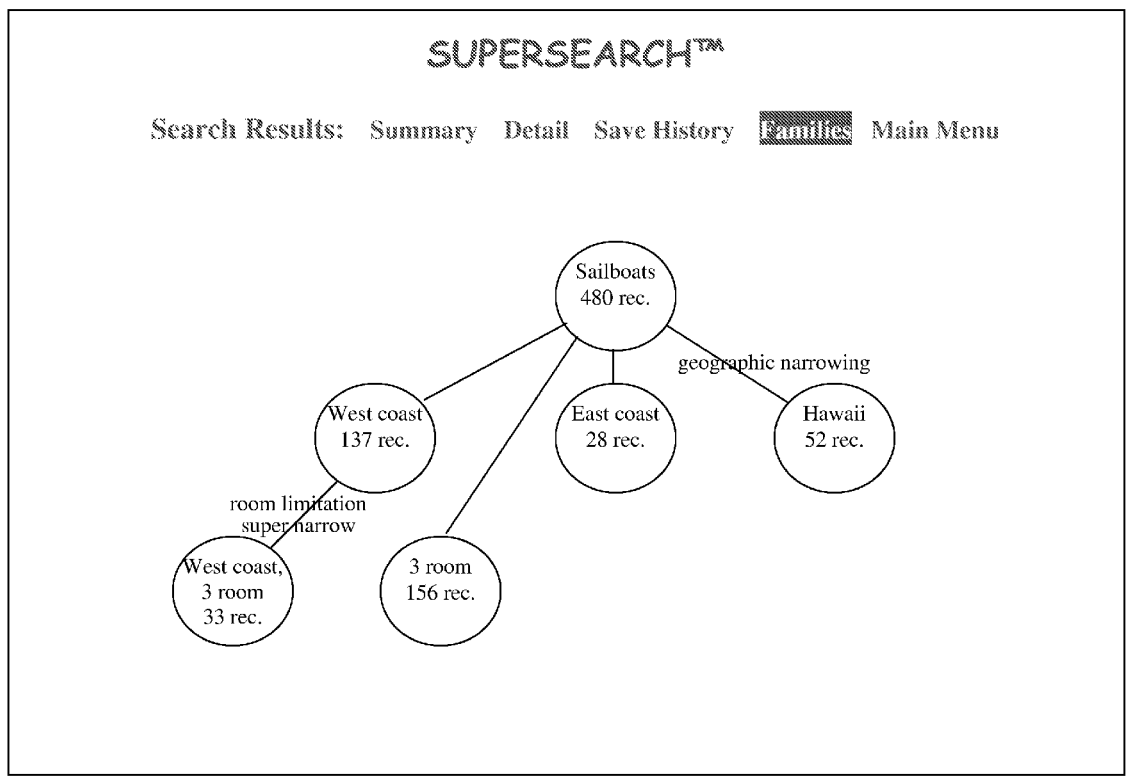
FIG. 4E is a mock-up of a sample search results display interface, showing families of queries or record sets.

FIG. 4E is a mockup of relations between record sets that could have been stored using an interface such as the records table 320 of FIG. 4D. In this particular example the relationships are parent/child, and are graphed in a standard manner with "Sailboats" being results from a grandparent search, and "West coast, 3 room" for example, being results from a grandchild search. In the event the relationships were other than simply parent/child, the interface might well include descriptors of the relationships along the various lines. For example, in this instance the mockup shows one of the relationships as having been characterized by the user as "geographic narrowing." Indeed, users can characterize logical relationships between among queries, and between or among records sets (regardless of whether the records contain information about persons, places, things, information, or even queries), using multiple characterizations. In FIG. 4E one of the relationships contains two characterizations.

Figure 5A:
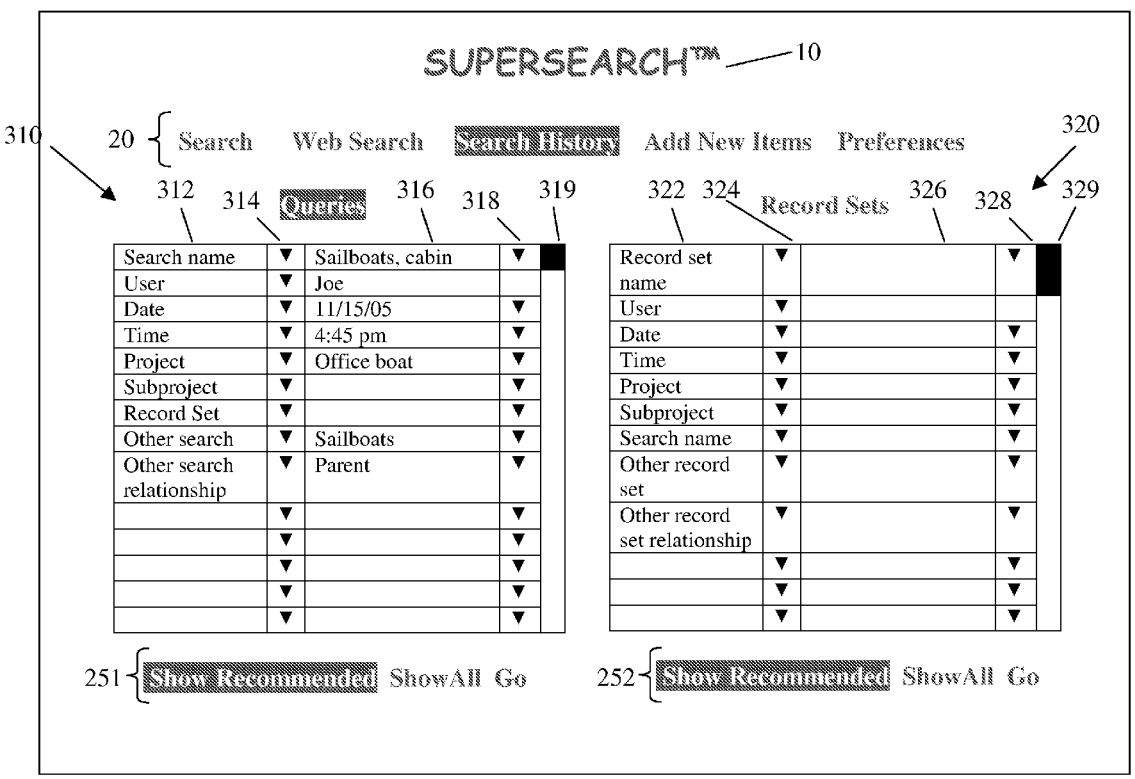
FIG. 5A is a mock-up of a sample search history interface, through which a user can find previously saved queries and record sets, in this case showing a user accessing previously saved queries.

FIGS. 5A and 5B show substantially the same interface as FIG. 4D, but here the user is accessing rather than saving search or records histories. FIG. 5A shows an example where previously stored queries are being searched, and FIG. 5B shows an example where previously stored record sets are being searched.

Figure 6A:
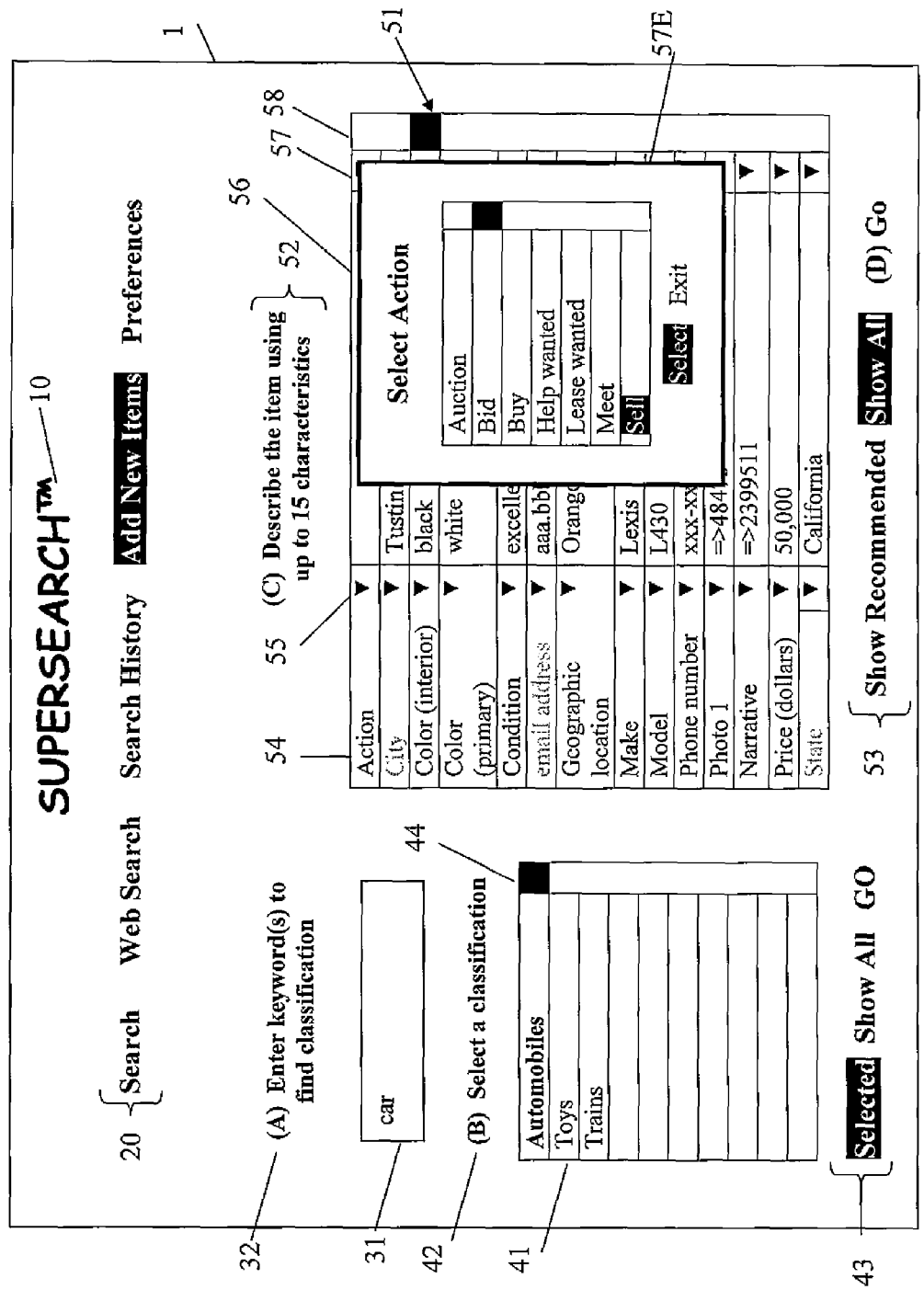
FIG. 6A is a mock-up of a sample interface for adding new items.
Figure 6B:
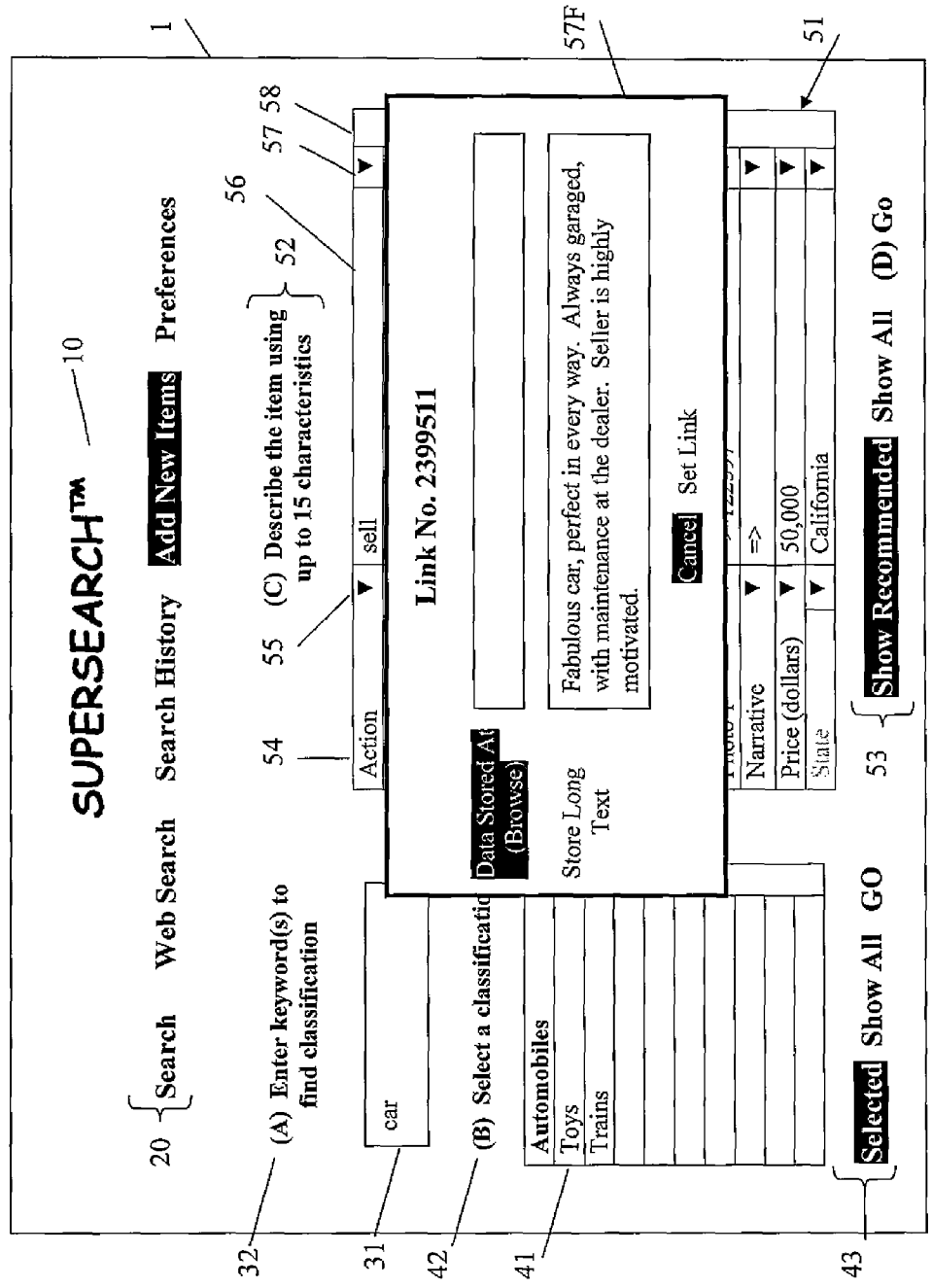
FIG. 6B is a mock-up of a sample interface for adding new items, showing an interface for setting a link to a memo or other long text data.

FIGS. 6A, 6B show substantially the same interface 10 of FIGS. 1A-1D and 2, except that the navigation line 20 is selected to "Add New Items", and the functionality is a bit different. In this case the user still goes through the same steps (A) through (D) as discussed previously, but here the user is acting as a data provider rather than a data searcher. Clicking on the GO button stores the item record, and takes the user to a verification interface, which can advantageously be a full record interface such as those of FIG. 4C. FIG. 6A shows a sample drop-down box 57E, which in this instance shows value choices for the "action" parameter. FIG. 6B shows a sample pop-up box 57F, which in this instance allows the user to either browse for a file or other data, or add long text that will be stored by the system.

FIG. 7 is an interface for entering and maintaining user information and preferences. The interface 300 generally comprises the company identifier 10 and navigation line 20 discussed previously, and also includes a personal information table 331 and instructions 332, radio buttons for selecting groupings for maximum number of records output 342, web search number of records 344, standard units 346, override units 348, language 350, and adult filter 352, and a units table 360. Of course, the same or similar information could readily be gathered or selected in some other manner, and additional or other information than shown in FIG. 7 could be implemented.

In this particular embodiment the table shows both standard parameters of name, address, and so forth, and allows users to enter any other relevant information. Also shown are several optional parameters and values, in this particular example relating to occupation, interests, and marital status. Any of all of such information could advantageously be used in narrowing Web searches (see FIG. 3), or perhaps ranking search results.

In an especially preferred embodiment, the units table 360 is initially populated with values as a function of the selection in standard units 346, but allows a user to change his/her preferences on specific units. Thus, for example, a user may prefer to use American units for most measurements, but use MKS units for force. The interface also allows a user to select preferred units within a system. Thus, a real estate user may prefer to default to square feet for area, while a farmer may prefer to default to acres.

B. Database Design

As discussed above, there is generally a trade-off in database design between efficiency of storage and efficiency of retrieval. U.S. Pat. Nos. 6,035,294, 6,195,652, and 6,243,699 contemplated a design that was quite efficient for storage, especially given that users could add their own new parameters to the system at will. But that system turns out to be extremely poor in terms of retrieval efficiency.

Figure 8:
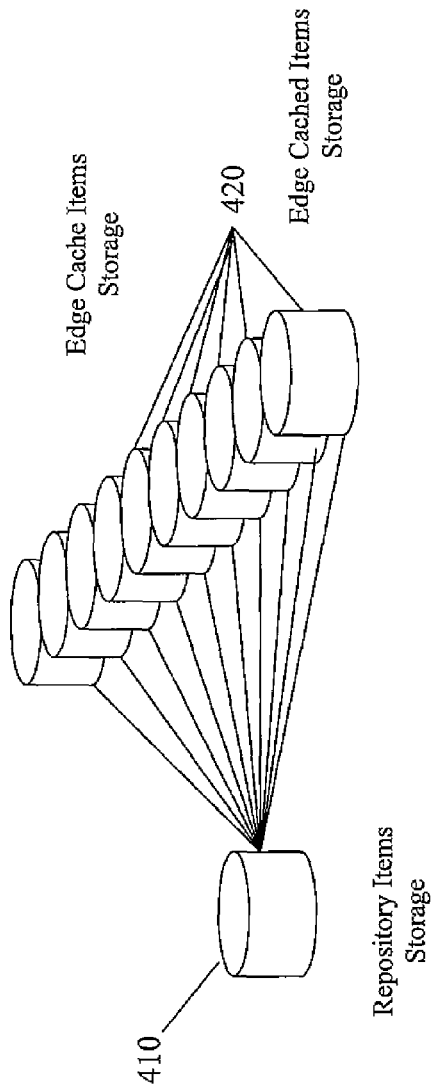
FIG. 8 is a schematic of a plurality of edge cache servers receiving data from a data repository.

It now contemplated that instead of conducting all searches against the same database, it is far more efficient to have a repository for all item records, and then copy records for particular classes to edge cache servers for searching. An exemplary configuration is shown in FIG. 8. There, the repository 410 contains all item records, and various edge cache servers 420 contain subsets by class. It should be appreciated that in showing the repository 410 as a single unit, the data is not necessarily all stored on the same physical device. Indeed, a preferred configuration uses the Zetera™ technology that allows for convenient distribution and mirroring of data across multiple, even widely geographically distributed physical storage media. The same can be said of the various edge cache items storage 420.

Storages 410 and 420 should be interpreted as being both memories and one or more computers that access the memories. The memories are preferably networked, most preferably using inexpensive arrays of network attached storage units (NAS) or SANs. A particularly desirable architecture is accessed using more or less direct block level access, such as that provided by the IP addressable storage systems of Zetera.™ The computers are also preferably networked, and can advantageously be implemented using very low cost blade servers, or future developments of same.

As described more fully below, the repository 410 may well have the same, or a different data structure from that of the edge cache storage 420. It is currently contemplated that the best configuration may be to use a data structure such as that in FIG. 9 for the repository 410, and one or both of the data structures of FIGS. 10A, 10B for the edge cache storage 420. In that embodiment, one or more farm servers would keep track of usage for different classes of items, and instruct the system to load items data for individual classes onto one or more of the edge cache storage servers. Thus, in a system with ten edge cache servers, it may well be that servers 1-4 each contain copies of the real estate class items, servers 5-6 might each have copies of the personals and employment class items, server 7 might have a copy of the automobile class items, and servers 8-10 might split among them copies of the items for the remaining classes. As usage shifts, more servers can be brought on-line, and/or the classes administered by the various servers may be shifted about.

Figure 9:
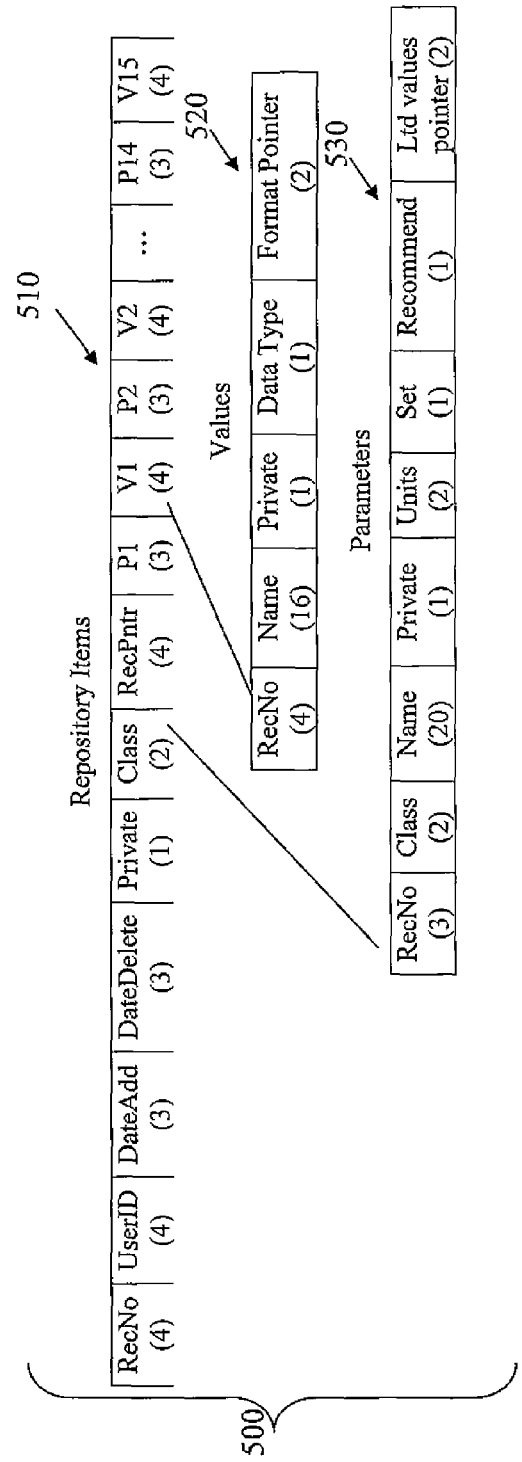
FIG. 9 is a schematic of parameters, values and items record layouts in a data repository.

FIG. 9 shows a possible data structure 500 for the repository 410. This structure utilizes a parameters table 510 that includes pointers to class, a literal of the parameter name, a designation of whether this parameter is kept private to data providers, a pointer to a units table, a group number that could be used to group parameters, a designation as to whether this parameter is recommended for the class, and a pointer to a limited values table. The privacy indicator could be as simple as a yes/no indicator, or could be stored as a range (e.g. 0-10), or could include some other information such as a passcode. In the latter case the field would need to be enlarged. As configured, each record consumes 32 bytes, providing 16 records per block for data storage structures using logical block lengths of 512 bytes. Even assuming 10,000 parameters, the table will only be 625 blocks long, or 320,000 bytes.

The units table will probably grow to be quite extensive, because there are more than 9,000 generally recognized units of measurement. The limited values table can advantageously contain a number of values group. For example, one grouping of limited values might be a listing of automobile makers, and another grouping might be a listing of ten or twenty basic colors (red, orange, yellow, green, blue, violet, white, black, tan, silver, gold, etc. The numbers in parenthesis are bytes sizes that could be utilized. It is estimated that the system will contain a thousand or more classes, each with between twenty and 60 parameters. The size of each record in this sample table is 123, providing 4 records per 512 byte block. A table containing 2,000 parameters is only about half a megabyte.

The values table 520 includes a literal of the value name, a designation as to whether this value should be kept private to data providers, and data type (floating point, integer, IP pointer, text, etc), and a pointer to a format designation (e.g. nnn.nnn.nnnn, nnnnn.nn, AAAnn, etc). Since number literals and pointers can be stored directly in the values fields of the items table, the values table only needs to store text. Nevertheless, it is contemplated that there could be several thousand records in the values table. The 16 byte size for values literals is a tradeoff among several different factors, but most especially a desire to accommodate most values literals, while discouraging users from using excessively long values. Sixteen bytes is plenty to store almost all values, including. The reader will note that we avoid most two-word values such as "excellent condition" because "excellent" is a value of the parameter "condition". There is no need to repeat the parameter within the value. Record in this table are estimated to be 24 bytes, providing 21 records per 512 byte block. A table containing 10,000 values is again only about half a megabyte.

The items table 530 contains a pointer to a user ID record, the date the record was added, a date that the record is scheduled to be deleted, a privacy designator, a pointer to class, a pointer to another record, and a series of parameter/value pairs, (which in this case is shown as 15). Such fields should all be self-explanatory, except perhaps the other record pointer, which can be used to associate records to provide more than 15 parameter/value pairs. For example, storing of searches is preferably implemented using two records. The first record could advantageously include the parameters and values identified by the user through a Save History interface such as table 310 (FIG. 4D), and the second record could advantageously include the actual search parameters entered by the user through a Search interface such as table 51 (FIG. 1A). The same could also be true for records sets, where the first record could advantageously include the parameters and values identified by the user through a Save History interface such as table 320 (FIG. 4D), and the second record could advantageously include a listing the records. Still further, the same system could be used for storing user information, where the first record could advantageously include the parameters and values for Last name, First name, Address1, Address2, city, State, Country, and Postal Code, and the personal information 332 of FIG. 7, and the second identified by the user through a Save History interface such as table 320 (FIG. 4D), and the second record could advantageously include a listing the records. The second record, could of course point to a third record, which could point to a fourth record, and so forth.

Assuming the parameter pointers require only three bytes, and that numbers can be stored in five bytes, the record is 126 bytes long, which allows 4 records per 512 byte block. Thus, one could store 500 million item records using only about 12.5 gigabytes of storage. As discussed elsewhere herein, the items can include records characterizing all manner of marketplace goods and services, intellectual goods and services such as newspaper, magazine, and journal articles, times and locations of movies and other entertainment events, information on conferences, as well as any other type of information, and queries and record sets.

Those skilled in the art will appreciate, however, that data structure 500 is extremely inefficient for searching. To match all items for a given class that have five or six parameter/value limitations, the system has to filter by class, then parse and examine the entire record of every record. For instances where there are hundreds of thousands of records, that process is just way too slow.

Readers should also appreciate that the system is capable of handling multiple instances of a given parameter for a given item. Thus, in characterizing a person in a personals advertisement record, the person (or computer) entering the data could list interests in a particular order of importance, using for example, "interests1", "interest2", "interest3", or perhaps "primary interest", "secondary interest", "tertiary interest", or the person or computer could simply enter the data using multiple instances of a generic "interest" parameter.

Figure 10A:
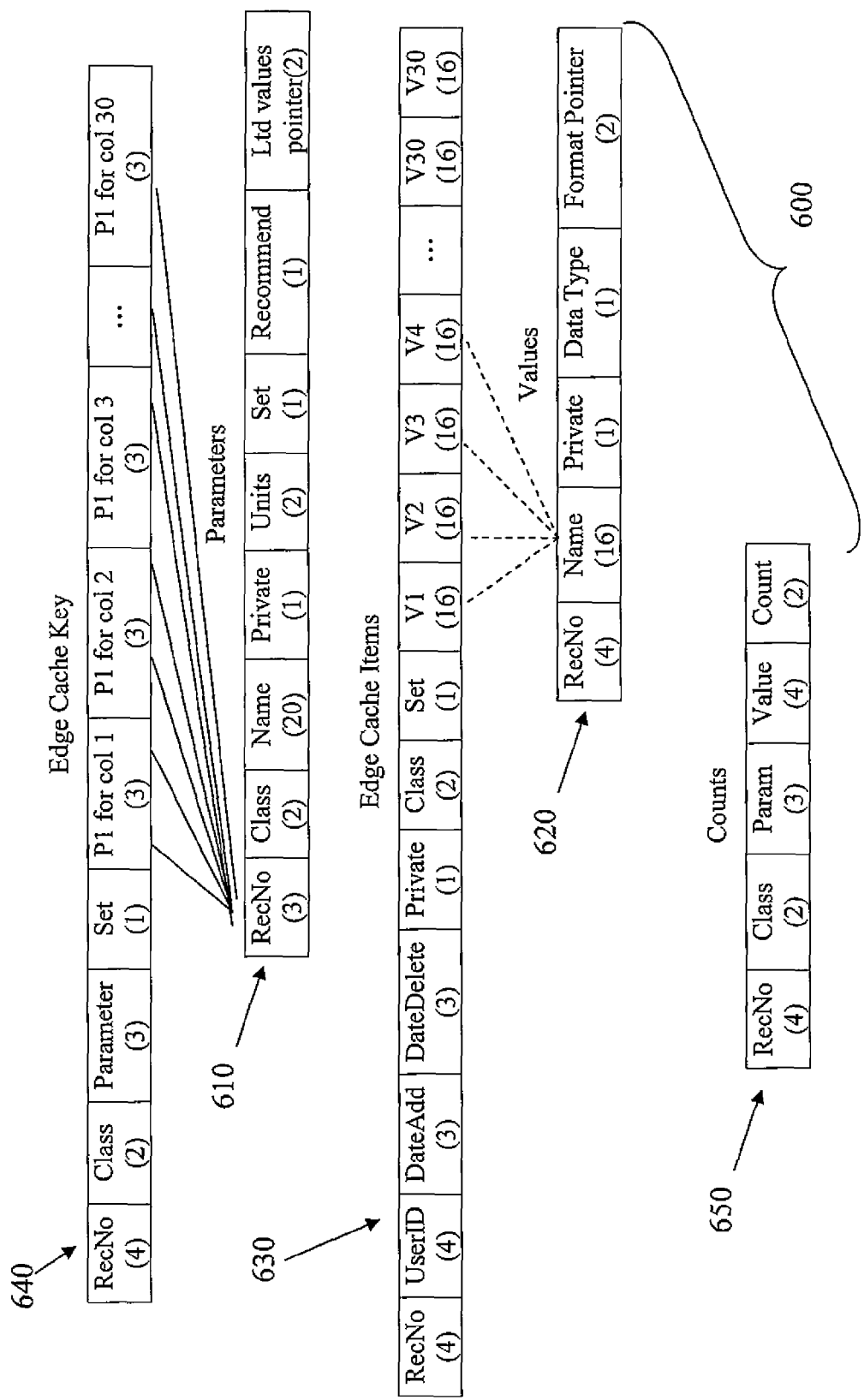
FIG. 10A is a schematic of parameters, values, items, edge cache key, and counts record layouts in a preferred edge cache server.
Figure 10B:
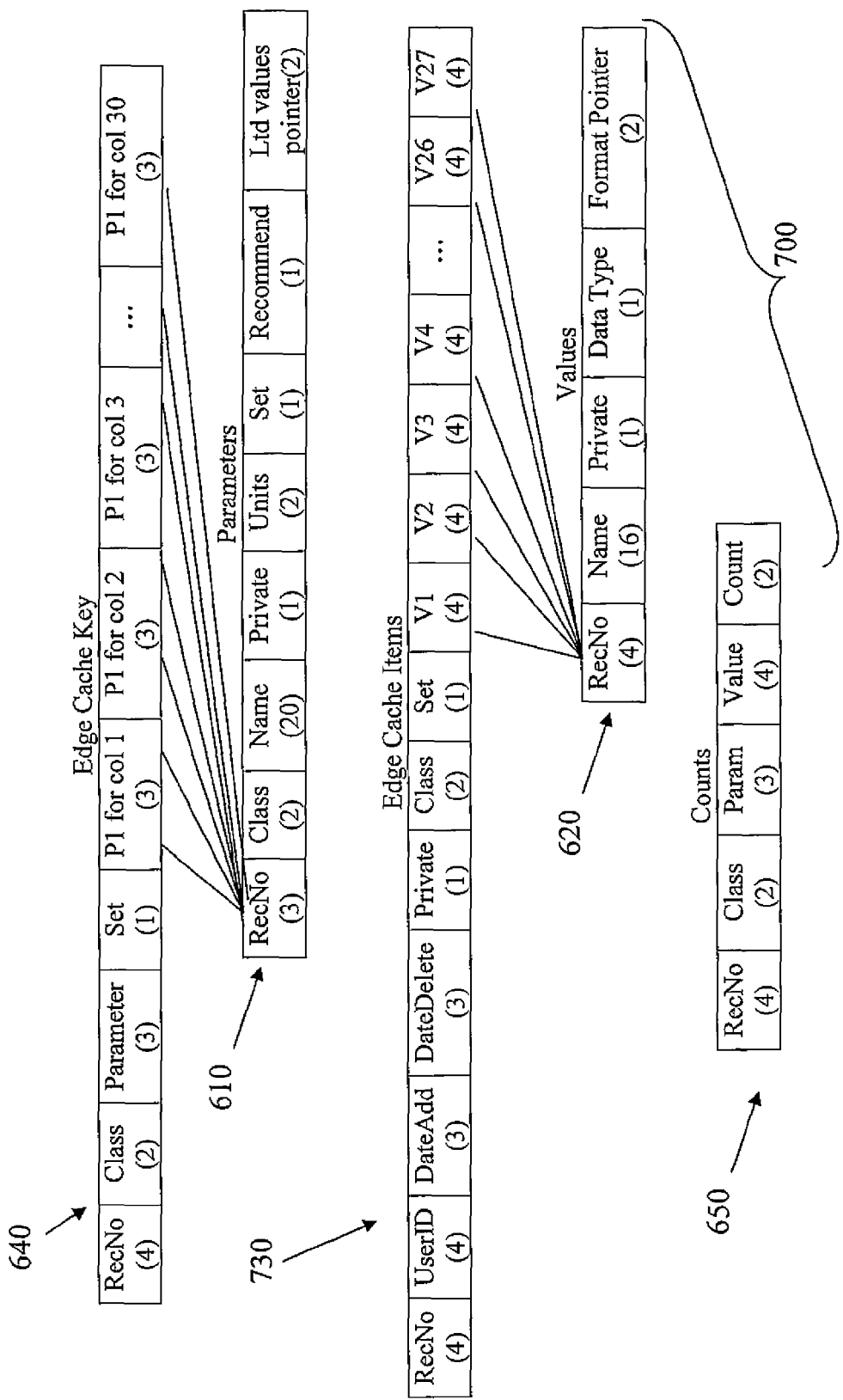
FIG. 10B is a schematic of parameters, values, items, edge cache key, and counts record layouts in an alternative edge cache server.

FIG. 10A shows a data structure 600 that is preferably used for the edge cache servers 420, but could also be used for the repository 410 or even other third files. Here, the system uses the same parameter 610 and values 620 records, and still stores the literal values or value pointers in the items table 630. In FIG. 10A the system stores literal values (designated by the dotted lines), and in FIG. 10B, the system stores pointers to the value records (designated by solid lines).

The major twist here is that instead of storing the parameters pointers in the items table 630, the parameter pointers are stored in a key file 640, which designates which columns in the items tables are used for which parameters. The significant twist over a normal table header is that the columns are used for different parameters depending on the class of the record. For example, columns 8-10 could be used to store values and value pointers for the parameters make, model, and year in an automobile class, but also the parameters no. beds, no. baths, and area for a real estate class. A significant difference here is that the values can be unpacked, and literals stored in the table instead of values pointers for both numbers and text. Interestingly, even assuming that we utilize 16 bytes for literals, records are only 498 bytes. Thus, item records for a class with a million items can be stored in 512 megabytes, allowing processing to proceed entirely within internal RAM. Similarly, a processor could handle 20 or 30 smaller classes in the same database, where the total number of records is still only about a million.

Those skilled in the art will appreciate that multiple instances of a given parameter in a given items record can be readily accommodated. The system would simply have multiple instances of the parameter pointer in the Key record 640, and would use an appropriate logical OR in searching the Items database 630 or 730.

Thus, systems and methods are contemplated in which a single table can store parameterized descriptions for millions of different items, which comprise hundreds or even thousands of different types of items, where collectively the different items are stored using hundreds or thousands of different parameters.

In FIG. 11 a table 800 stores descriptions of multiple different types of marketplace items as a collection of parameter-value pairs. In particular, each row stores up to 16 values for a given item (columns 8-16), and the class pointer in each row acts as a key that can be used to decipher mappings of the values columns to different ones of the parameters. Of particular interest here is that the table explicitly shows eight different keys (1111, 111, 2534, 2323, 223, 224, 222, and 1999. Readers should understand that the records represented by the ellipsis (" . . . ") above the last row contain many more, and likely many thousands of additional keys. Given that number of keys, the table should be interpreted as storing values for more than 1000 parameters. Also of interest is that the ellipsis between columns V4 and V26 should be interpreted such that mappings for at least two of the rows have different mappings for at least ten of the columns. Of still further interest, several or all of the columns can contain different types of data, literals represented by <num> and <text>, and pointers to: (a) data elements in another table of the system; (b) URLs or addresses in a public package switched network; and (c) HTML code represented by <pnt>. For example, the column for V1 should be interpreted as having a number in row 8 and alphabetic text in row 7. The lengths of each of the columns are given in parenthesis in the header, so that this particular table contains records having a length of no more than 512 byes, and the table requires no more than 30 megabytes to store 100,000 records of the marketplace items.

Theses database are extremely fast to search because a standard SQL or other search command can be used to match data, use wildcards, ranges, and so forth. Indeed, it is contemplated that all of the processing done at the edge cache servers can be accomplished entirely in internal memory, thereby vastly increasing the speed of the system. Moreover, one could readily use blade servers, where a single box could have ten or more servers, which are booted up using a single hard-drive.

Now it is true that the contemplated records in the items table 630 only provide 30 columns for values. One would ordinarily assume that such a limitation could not accommodate items records in a class having 60 or 70 different parameters. That problem is solved by using the set field to designate different sets of parameters. Thus, for a real estate classification, columns 8-10 could be used to store values and value pointers for the parameters "No. beds", "no. baths", and "living area" for a real estate class in set 1, and the three same columns could be used to store values and value pointers for the parameters "pool", "gazebo", and "bath house" for the same real estate class in set 2. That added level of complexity still doesn't prevent the system from using standard search commands against the items database 630; one simply also needs to include a restriction as to class.

If one did choose to load data into the data structure 600 using records from data structure 500 for a given class, for example, the process would be straightforward. One could advantageously identify the parameters and values used in each record being loaded, and count the occurrences in a table using a record format such as counts record 650. After examining all the records, it is a simple matter to determine which parameters are the most frequently used, and then create one or more key records in which the most commonly used parameters are associated with low column numbers, and the less frequently used parameters are associated with higher column numbers, or even columns in a second or third set. Where records are loaded for multiple classes, the system would simply create multiple key records for the different classes. The system need not, but could use the data in the key records to determine which parameters and values are recommended.

As discussed above, items table 700 in FIG. 10B is similar to items table 600 FIG. 10A, except that the values cells are loaded with pointers to the values table rather than the literal values. Assuming one reduces the number of values columns from 30 to 27, that allows 126 byte records, which is as efficient in terms of storage table 500, but still only half as efficient as table 600. One can also readily envision an intermediate table (not shown) that includes the first 8 bytes of each value rather than the full 16 bytes. Such a table could have 29 values columns and still have only 250 byte blocks. Tables 610, 620, 640, and 650 are as discussed above, but table 630 has been replaced by table 730.

C. Private Data

It is well known to provide password protected security to information at a document level. Microsoft™ Word™ and Excel™ documents, for example, can both be encrypted, with decryption controlled by password protection. It is also known to provide password protected security at a supra-document level, as for example by providing password protection to entire directories, applications, or web sites, which might contain dozens or even thousands of page documents. It is also commonplace to encrypt information in individual packets transmitted information on a packet switched network. And it is commonplace to encrypt individual segments or frames of a video or audio file.

What is not known, however, is password type security protection at the sub-document level, where some portions in a document are encrypted but the remainder or at least other portions of the document are not encrypted. Perhaps one of the simplest examples is a letter in which most of the text is ordinary ASCI, but numbers or other information of key importance are encrypted. On display by Word™ or other word processor, such a document would either be displayed entirely as "garbage", or more preferably the non-encrypted portion would be displayed normally, with the encrypted portion being displayed in some non-readable format such as "*****" or "######". Thus, a sentence might read "Please transfer ####### to the checking account No. ######." Clicking on the encrypted portion would initiate an authorization routine that may, for example, prompt the viewer for a password or key.

Sub-document encryption may be especially useful in hyper-text documents. For example, an HTML letter may include hyperlinks to WWW web pages. When the letter is displayed by a Web browser, or perhaps an HTML compliant e-mail browser, one or more of the linked portions may be readable only if the viewer supplies the correct password(s).

As indicated above, decryption may be authorized by prompting a viewer for a password upon the viewer's clicking on an encrypted portion. All other methods, however, of authorization are also contemplated. For example, authorization could be prompted by moving a cursor over or near an encrypted portion, such as with the "tab" or other cursor movement keys. Another possibility is that prompting for a password occurs without any viewer action upon display of the document. HTML is essentially a script type language, and display of an HTML document involves execution of the script by some sort of interpreter. When the interpreter evaluates the encrypted portion, it could automatically prompt the viewer for a password at that time. Still another alternative is that the viewer's system could store one or more passwords in a "library" for use in decoding a document upon display.

The term "password" is used herein to mean any form of authorization. Passwords are thus contemplated to include literals that satisfy an exact lookup match, or perhaps a wild-card match. By way of example, a portion of a document may be decrypted using any password that matches the format FET##QWA where # is a numeric digit. Different users may be given different digit portions of the password, and the system could keep track of which passwords were used at which times. Passwords may also be keys, such that the password itself is used not only as authorization but as a literal to assist in decrypting the encrypted portion.

Where "matches" are used in decrypting, the "match" against which a password may be compared may be stored within the document itself, such as in a tagged portion. XML or other tagging protocol may advantageously be used for that purpose, especially since CML allows hierarchical and associative tagging. Thus, a word or other phrase and its corresponding password may be stored in encrypted form, and tagged with a first tag indicating that the phrase is encrypted, and a second tag that indicating that the password is to be used to decrypt the phrase. Key type passwords may be stored in a corresponding manner within the document.

Alternatively, the password(s) used in decrypting a document may be stored elsewhere entirely. In hyperlinked documents, for example, one or more passwords may be stored in a web page that is completely disconnected from the document. In that case a document could be disseminated, and subsequently the password(s) could be changed so that even those viewers who received the document, and knew the passwords at one time, would be unable to decrypt one or more encrypted portions of the document.

Encryption of individual values is especially useful where multiple different types of marketplace items are stored in, and retrieved from, a system that parametizes the data using at least five, ten, twenty or more parameters. Among other things, this would allow data providers to store information on a public access database, while retaining a reasonable level of comfort that the data will be protected. It would also allow data providers to use a public access database to store pointers to data within their own private databases or websites, while ensuring that they, but not others, could visualize the data when desired. In FIG. 4A, for example, the email address in the third data row is obfuscated with the ##### symbol.

Thus, specific embodiments and applications for data characterization have been disclosed. It should be apparent, however, to those skilled in the art that many more modifications besides those already described are possible without departing from the proposed claims and the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A computer system that stores descriptions of multiple different types of marketplace items as a collection of parameter-value pairs, comprising:
   at least one server comprising a memory configured to store:
      a table having a plurality of rows and columns, wherein values for at least a first item and a second item of the items are stored in cells of a first row and a second row, respectively, of the plurality of the rows;
      a first item class key stored in the first row associated with the first item, wherein the first item class key represents a first item class and provides information used to decipher differential mappings of a plurality of the columns to a first plurality of parameters for the first row; and
      a second item class key different from the first item class key stored in the second row associated with the second item, wherein the second item class key represents a second item class different from the first item class, and wherein the second item class key provides information used to decipher differential mappings of the plurality of the columns to a second plurality of parameters for the second row that is different from the first plurality of parameters and where the mappings of the second row are different from the mappings of the first row;
   a first display interface configured to display to a human end-user identifiers for at least two of the parameters; and
   a second display interface configured to display to the user at least some values associated in the system with at least one of the first and second pluralities of parameters.

2. The system of claim 1, wherein the table contains at least five additional keys that provide information that can each be used to decipher differential mappings of a plurality of the columns to a plurality of parameters for other ones of the rows, respectively.

3. The system of claim 1, wherein the mappings for at least two of the rows have different mappings for at least ten of the columns.

4. The system of claim 1, wherein the table has at least thirty columns.

5. The system of claim 1, wherein at the least one of the columns is differentially interpreted as having different types of data in cells of the column.

6. The system of claim 5, wherein at least one of the types of data comprises a literal.

7. The system of claim 6, wherein at least another of the types of data comprises a pointer to a data element in another table of the system.

8. The system of claim 6, wherein at least another of the types of data comprises a pointer to an address in a public package switched network.

9. The system of claim 6, wherein at least another of the types of data comprises a pointer to an HTML code.

10. The system of claim 5, wherein one of the types of data comprises a number, and another of the types of data comprises alphabetic text.

11. The system of claim 1, wherein the first table contains records having a length of no more than 512 byes.

12. The system of claim 1, wherein the plurality of parameters numbers more than 1000.

13. The system of claim 1, wherein the first table requires no more than 30 megabytes to store 100,000 records of the marketplace items.

14. The system of claim 1, wherein the first table requires no more than 60 megabytes to store 100,000 records of the marketplace items.

15. The system of claim 1, further comprising a second data structure that contains equivalent parameter-value information for at least some of the marketplace items, but differs in structure from the first table.

16. The system of claim 15, wherein the second data structure stores at least some parameter data as parameter pointers.

17. The system of claim 15, wherein the second data structure stores at least some of the values as value pointers, and at least some of the values as literals.

18. The system of claim 15, wherein the first data structure requires at least twice as much space to store a set of at least 100,000 marketplace items as the second structure.

19. The system of claim 17, wherein the first data structure requires at least four times as much space to store a set of at least 100,000 marketplace items as the second structure.

20. The system of claim 1, wherein values for a third item are stored in cells of a third row of the table, and wherein the memory is further configured to store a third item class key equal to the first item class key, and wherein the third item class key is stored in the third row and represents the item class of the first and third items, and wherein the third item class key provides information used to decipher differential mappings of a plurality of the columns to a third plurality of parameters for the third row.

21. The system of claim 1, wherein a first number of parameters contained in the first plurality of parameters is less than a second number parameters contained in the second plurality of parameters.

* * * * *